United States Patent
Taylor

(10) Patent No.: US 7,647,526 B1
(45) Date of Patent: Jan. 12, 2010

(54) REDUCING RECONSTRUCT INPUT/OUTPUT OPERATIONS IN STORAGE SYSTEMS

(75) Inventor: James A. Taylor, Livermore, CA (US)

(73) Assignee: NetApp, Inc., Sunnyvale, CA (US)

( * ) Notice: Subject to any disclaimer, the term of this patent is extended or adjusted under 35 U.S.C. 154(b) by 425 days.

(21) Appl. No.: 11/634,497

(22) Filed: Dec. 6, 2006

(51) Int. Cl.
*G06F 11/00* (2006.01)
(52) U.S. Cl. ............................................. 714/6; 714/7
(58) Field of Classification Search ..................... 714/6, 714/7
See application file for complete search history.

(56) References Cited

U.S. PATENT DOCUMENTS

| | | | |
|---|---|---|---|
| 3,876,978 A | 4/1975 | Bossen et al. |
| 4,092,732 A | 5/1978 | Ouchi |
| 4,201,976 A | 5/1980 | Patel |
| 4,205,324 A | 5/1980 | Patel |
| 4,375,100 A | 2/1983 | Tsuji et al. |
| 4,467,421 A | 8/1984 | White |
| 4,517,663 A | 5/1985 | Imazeki et al. |
| 4,547,882 A | 10/1985 | Tanner |
| 4,667,326 A | 5/1987 | Young et al. |
| 4,688,221 A | 8/1987 | Nakamura et al. |
| 4,722,085 A | 1/1988 | Flora et al. |
| 4,755,978 A | 7/1988 | Takizawa et al. |
| 4,761,785 A | 8/1988 | Clark et al. |
| 4,775,978 A | 10/1988 | Hartness |
| 4,796,260 A | 1/1989 | Schilling et al. |
| 4,817,035 A | 3/1989 | Timsit |
| 4,825,403 A | 4/1989 | Gershenson et al. |
| 4,837,680 A | 6/1989 | Crockett et al. |
| 4,847,842 A | 7/1989 | Schilling |
| 4,849,929 A | 7/1989 | Timsit |
| 4,849,974 A | 7/1989 | Schilling et al. |
| 4,849,976 A | 7/1989 | Schilling et al. |
| 4,870,643 A | 9/1989 | Bultman et al. |
| 4,899,342 A | 2/1990 | Potter et al. |
| 4,989,205 A | 1/1991 | Dunphy, Jr. et al. |
| 4,989,206 A | 1/1991 | Dunphy, Jr. et al. |
| 5,077,736 A | 12/1991 | Dunphy, Jr. et al. |
| 5,088,081 A | 2/1992 | Farr |
| 5,101,492 A | 3/1992 | Schultz et al. |

(Continued)

FOREIGN PATENT DOCUMENTS

EP        1 324 200 A2    7/2003

(Continued)

OTHER PUBLICATIONS

Anvin, Peter H, "*The Mathematics of RAID 6*," Dec. 2004.

(Continued)

*Primary Examiner*—Marc Duncan
(74) *Attorney, Agent, or Firm*—Cesari and McKenna, LLP

(57) ABSTRACT

The present invention provides a system, method, and computer program product for partially pre-writing data stored in an array of mass storage devices to a spare disk dedicated to the array prior to detecting a failure in the array. The system then reconstructs data from the failed disk using data partially pre-written to the spare disk. Since some of the data has already been pre-written to the spare disk, embodiments of the present invention reduce the number of I/O operations performed by a storage system during a process of reconstructing data from the failed disk to the spare disk.

32 Claims, 15 Drawing Sheets

U.S. PATENT DOCUMENTS

| | | |
|---|---|---|
| 5,128,810 A | 7/1992 | Halford |
| 5,148,432 A | 9/1992 | Gordon et al. |
| RE34,100 E | 10/1992 | Hartness |
| 5,163,131 A | 11/1992 | Row et al. |
| 5,166,936 A | 11/1992 | Ewert et al. |
| 5,179,704 A | 1/1993 | Jibbe et al. |
| 5,202,979 A | 4/1993 | Hillis et al. |
| 5,208,813 A | 5/1993 | Stallmo |
| 5,210,860 A | 5/1993 | Pfeffer et al. |
| 5,218,689 A | 6/1993 | Hotle |
| 5,233,618 A | 8/1993 | Glider et al. |
| 5,235,601 A | 8/1993 | Stallmo et al. |
| 5,237,658 A | 8/1993 | Walker et al. |
| 5,257,367 A | 10/1993 | Goodlander et al. |
| 5,271,012 A | 12/1993 | Blaum et al. |
| 5,274,799 A | 12/1993 | Brant et al. |
| 5,305,326 A | 4/1994 | Solomon et al. |
| 5,351,246 A | 9/1994 | Blaum et al. |
| 5,375,128 A | 12/1994 | Menon et al. |
| 5,410,667 A | 4/1995 | Belsan et al. |
| 5,537,567 A | 7/1996 | Galbraith et al. |
| 5,579,475 A | 11/1996 | Blaum et al. |
| 5,623,595 A | 4/1997 | Bailey |
| 5,657,468 A | 8/1997 | Stallmo et al. |
| 5,805,788 A | 9/1998 | Johnson |
| 5,812,753 A | 9/1998 | Chiariotti |
| 5,819,292 A | 10/1998 | Hitz et al. |
| 5,862,158 A | 1/1999 | Baylor et al. |
| 5,884,098 A | 3/1999 | Mason, Jr. |
| 5,948,110 A | 9/1999 | Hitz et al. |
| 5,950,225 A | 9/1999 | Kleiman |
| 5,963,962 A | 10/1999 | Hitz et al. |
| 6,038,570 A | 3/2000 | Hitz et al. |
| 6,092,215 A | 7/2000 | Hodges et al. |
| 6,138,125 A | 10/2000 | DeMoss |
| 6,138,126 A | 10/2000 | Hitz et al. |
| 6,138,201 A | 10/2000 | Rebalski |
| 6,158,017 A | 12/2000 | Han et al. |
| 6,223,300 B1 | 4/2001 | Gotoh |
| 6,247,157 B1 | 6/2001 | Edirisooriya |
| 6,289,356 B1 | 9/2001 | Hitz et al. |
| 6,532,548 B1 | 3/2003 | Hughes |
| 6,557,123 B1 | 4/2003 | Wiencko et al. |
| 6,571,326 B2 | 5/2003 | Spiegel et al. |
| 6,581,185 B1 | 6/2003 | Hughes |
| 6,671,772 B1 | 12/2003 | Cousins |
| 6,742,137 B1 | 5/2004 | Frey, Jr. |
| 6,779,095 B2 | 8/2004 | Selkirk et al. |
| 6,799,284 B1* | 9/2004 | Patel et al. ............... 714/6 |
| 6,845,465 B2* | 1/2005 | Hashemi ............... 714/6 |
| 6,993,701 B2 | 1/2006 | Corbett et al. |
| 7,073,115 B2 | 7/2006 | English et al. |
| 7,203,892 B2 | 4/2007 | Corbett et al. |
| 7,328,305 B2 | 2/2008 | Kleiman et al. |
| 7,409,625 B2 | 8/2008 | Corbett et al. |
| 2002/0083037 A1 | 6/2002 | Lewis et al. |
| 2002/0124137 A1 | 9/2002 | Ulrich et al. |
| 2003/0056142 A1* | 3/2003 | Hashemi ............... 714/6 |
| 2003/0229820 A1* | 12/2003 | Chatterjee et al. ............... 714/7 |
| 2005/0283654 A1* | 12/2005 | Wood et al. ............... 714/7 |
| 2005/0283655 A1* | 12/2005 | Ashmore ............... 714/7 |
| 2006/0041782 A1* | 2/2006 | Ali et al. ............... 714/6 |
| 2007/0079170 A1* | 4/2007 | Zimmer et al. ............... 714/6 |
| 2007/0168706 A1* | 7/2007 | Humlicek ............... 714/6 |
| 2007/0255870 A1* | 11/2007 | Chikusa et al. ............... 710/74 |
| 2008/0126850 A1* | 5/2008 | Kubo et al. ............... 714/7 |
| 2008/0178040 A1* | 7/2008 | Kobayashi ............... 714/6 |
| 2008/0263393 A1* | 10/2008 | Shirogane et al. ............... 714/7 |

FOREIGN PATENT DOCUMENTS

| | | |
|---|---|---|
| WO | WO-01/13236 A1 | 2/2001 |
| WO | WO-02/29539 A2 | 4/2002 |

OTHER PUBLICATIONS

Auspex 4Front NS2000, System Architecture, Network-Attached Storage For a New Millennium, Auspex Engineering Technical Report 24, Jan. 1999.

Bestavros, Azer, et al., *Reliability and Performance of Parallel Disks*, Technical Memorandum 45312-891206-01TM, AT&T, Bell Laboratories, Department 45312, Holmdel, NJ, Dec. 1989.

Bitton, Dina, *Disk Shadowing*, Proceedings of the $14^{th}$ VLDB Conference, LA, CA (1988).

Blaum, Mario, et al., *Evenodd: An Optimal Scheme for Tolerating Double Disk Failures in RAID Architectures*, Computer Architectures News, Association for Computing Machinery, New York, US, vol. 22, No. XP000450355, Apr. 1, 1994.

Blaum, Mario, et al., *Evenodd: An Efficient Scheme for Tolerating Double Disk Failures in RAID Architectures*, IEEE Transactions on Computers, vol. 44, No. 2, Feb. 1995, pp. 192-202.

Bultman, David L., *High Performance SCSI Using Parallel Drive Technology*, In Proc. BUSCON Conf., pp. 40-44, Anaheim, CA, Feb. 1988.

Chen, Peter et al., *Two Papers on RAIDs*. Technical Report, CSD-88-479, Computer Science Division, Electrical Engineering and Computer Sciences, University of California at Berkeley (1988).

Chen, Peter M., et al., *An Evaluation of Redundant Arrays of Disks Using an Amdahl 5890*, Performance Evaluation, pp. 74-85, 1990—check to see if exact same copy as one in WAFL.

Chen, Peter M.., et al., *Maximizing Performance in a Striped Disk Array*, Proc. 1990 ACM SIGARCH 17th Intern. Symp. on Comp. Arch., Seattle, WA, May 1990, pp. 322-331.

Chen, Peter M., et al., *RAID:High Performance, Reliable Secondary Storage*, ACM Computing Surveys, 26(2):145-185, Jun. 1994.

Chervenak, Ann L., *Performance Measurement of the First RAID Prototype*, Technical Report UCB/CSD 90/574, Computer Science Division (EECS), University of California, Berkeley, May 1990.

Copeland, George, et al., *A Comparison of High-Availability Media Recovery techniques*, in Proc. ACM-SIGMOD Int. Conf. Management of Data, 1989.

Courtright II, William V., et al., *RAIDframe: A Rapid Prototyping Tool for RAID Systems*, Computer Science Technical Report CMU-CS97-142, Carnegie Mellon University, Pittsburgh, PA 15213, Jun. 4, 1997.

Evans *The Tip of the Iceberg: RAMAC Virtual Array—Part I*, Technical Support, Mar. 1997, pp. 1-4.

Gibson, Garth A., et al., *Coding Techniques for Handling Failures in Large Disk Arrays*, Technical Report UCB/CSD 88/477, Computer Science Division, University of California, (Jul. 1988.).

Gibson, Garth A., et al., *Failure Correction Techniques for Large Disk Arrays*, In Proceedings Architectural Support for Programming Languages and Operating Systems, Boston, Apr. 1989, pp. 123-132.

Gibson, Garth A., et al., *Strategic Directions in Storage I/O Issues in Large-Scale Computing*, ACM Computing Survey, 28(4):779-93, Dec. 1996.

Goldick, Jonathan S., et al., *Multi-resident AFS: An Adventure in Mass Storage*, In Proceedings of the 1995 USENIX Technical Conference, pp. 47-58, Jan. 1995.

Graham, Susan L., et al., *Massive Information Storage, Management, and Use*, (NSF Institutional Infrastructure Proposal), Technical Report No. UCB/CSD 89/493, Jan. 1989.

Gray, Jim et al., *Parity striping of disc arrays: Low-Cost Reliable Storage with Acceptable Throughput*. In Proceedings of the 16th Very Large Data Bases Conference, pp. 148-161, Brisbane, Australia, 1990.

Grimes, DW Martinez, *Two Dimensional Parity Error Correction Procedure*, IBM Technical Disclosure Bulletin 2686-2689, Oct. 1982.

Grimes, DW Martinez, *Vertical Parity Generator for Two Dimensional Parity*, IBM Technical Disclosure Bulletin 2682-2685, Oct. 1982.

Hellerstein, Lisa, et al,. *Coding Techniques for Handling Failures in Large Disk Arrays*. In Algorithmica vol. 2, Nr. 3, 182-208 (1994).

Hitz, David, *TR3002 File System Design for a NFS File Server Appliance*, Network Appliance, Inc.

Hughes, James, et al., *High Performance RAIT*, Tenth NASA Goddard Conference on Mass Storage Systems and Technologies and Nineteenth IEEE Symposium on Mass Storage Systems, Adelphi, Maryland, USA, Apr. 2002.

Johnson, Theodore, et al., *Tape Group Parity Protection*, IEEE Symposium on Mass Storage, pp. 72-79, Mar. 1999.

Katz, Randy H. et al., *Disk System Architectures for High Performance Computing*, undated.

Kent, Jack et al., *Optimizing Shadow Recovery Algorithms*, IEEE Transactions on Software Engineering, 14(2):155-168, Feb. 1988.

Kim, Michelle Y., *Synchronized Disk Interleaving*, IEEE Transactions on Computers, C-35(11):978-988, Nov. 1986.

Kim, Michelle, et al., *Asynchronous Disk Interleaving Approximating Access Delays*, IEEE Transactions on Computers, vol. 40, No. 7, Jul. 1991, pp. 801-810.

Lawlor, F. D., *Efficient Mass Storage Parity Recovery Mechanism*, IBM Technical Disclosure Bulletin 24(2):986-987, Jul. 1981.

Lee, Edward K., et al., *RAID-II: A Scalable Storage Architecture for High-Bandwidth Network File Service*, Technical Report UCB/CSD 92/672, (Feb. 1992).

Lee, Edward K., et al., *The Performance of Parity Placements in Disk Arrays*, IEEE Transactions on Computers, vol. 42 No. 6, Jun. 1993, 14 pages.

Li, Don, et al., *Authors' Reply*, IEEE Transactions on Communications, 46:575, May 1998.

*Limited Distributed DASD Checksum, A RADI Hybrid*, IBW Technical Disclosure Bulletin, IBM Corp. New York, US vol. 35. No. 4A, XP000314813, Sep. 1, 1992.

Livny, Miron, et al., *Multi-Disk Management Algorithms*, In Proceedings of the ACM International Conference on Measurement and Modeling of Computer Systems (SIGMETRICS), pp. 69-77, Banff, Alberta, Canada, May 1987.

Meador, Wes E., *Disk Array Systems*, Proceedings of COMPCON, 1989, pp. 143-146.

Menon, Jai, et al., *Methods for Improved Update Performance of Disk Arrays*, IBM Almaden Research Center, IEEE, Jan. 1992, 10 pages.

Menon, Jai, et al., *Floating Parity and Data Disk Arrays*, Journal of Parallel and Distributed Computing, Boston: Academic Press. Inc., vol. 17 No. 1 and 2, Jan./Feb. 1993, 13 pages.

Microsoft Computer Dictionary, 5th Edition, 2002, p. 211.

Ng, Spencer, et al., *Trade-Offs Between Devices and Paths in Achieving Disk Interleaving*, IEEE International Symposium on Computer Architecture, 1988, pp. 196-201.

Ng, Spencer, *Some Design Issues of Disk Arrays*, Proceedings of COMPCON Spring '89, pp. 137-142. IEEE, 1989.

Park, Arvin, et al., *Providing Fault Tolerance in Parallel Secondary Storage Systems*, Technical Report CS-TR-057-86, Princeton, Nov. 1986.

Patel, Arvind M., *Adaptive Cross-Parity (AXP) Code for a High-Density Magnetic Tape Subsystem*, IBM Technical Disclosure Bulletin 29(6):546-562, Nov. 1985.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Patterson, David A., et al., *Introduction to Redundant Arrays of Inexpensive Disks (RAID)*. In IEEE Spring 89 COMPCON, San Francisco, IEEE Computer Society Press, Feb. 27-Mar. 3, 1989, pp. 112-117.

Storagesuite, *Performance Without Compromise: The Virtual Storage Architecture*, catalogue, 1997.

Reddy, A. L. Narasimha, et al.,*An Evaluation of Multiple-Disk I/O Systems*, IEEE Transactions on Computers, vol. 38, No. 12, Dec. 1989, pp. 1680-1690.

Scheuermann, Peter, et al., *Data Partitioning and Load Balancing in Parallel Disk Systems*, The VLDB Journal, vol. 7, Springer-Verlag, Copyright Feb. 1998, 19 pages.

Schulze, Martin E., *Considerations in the Design of a RAID Prototype*, Computer Science Division, Department of Electrical Engineering and Computer Sciences, Univ. of CA, Berkeley, Aug. 25, 1988.

Schulze, Martin., et al., *How Reliable is a RAID?*, Proceedings of COMPCON, 1989, pp. 118-123.

Shirriff, Kenneth W., *Sawmill:A Logging File System for a High-Performance RAID Disk Array*, CSD-95-862, Jan. 1995.

Stanek, William R., *Microsoft Windows 2000 Server: Administering Volume Sets and RAID Arrays*, Jan. 10, 2006, (http://www.microsoft.com/technet/prodtechnol/windows2000serv/maintain/operate/11w2kada.mspx), (Printed 1999).

Stodolsky, Daniel, et al., *Parity Logging Overcoming the Small Write Problem in Redundant Disk Array*, School of Computer Science and Department of Electrical and Computer Engineering, Carnegie Mellon University, IEEE, May 1993, 12 pages.

Stonebraker, Michael, et al., *The Design of XPRS*, Proceedings of the 14th VLDB Conference, LA, CA (1988).

Tanabe, Takaya, et al., *Redundant Optical Storage System Using DVD-RAM Library*, IEEE Symposium on Mass Storage, pp. 80-87, Mar. 1999.

TEKRAM—"About RAID 6".

Tweten, David, *Hiding Mass Storage Under UNIX: NASA 's MSS-H Architecture*, IEEE Symposium on Mass Storage, pp. 140-145, May 1990.

Weikum, Gerhard, et al., *Dynamic File Allocation in Disk Arrays*, ETH Zurich, Department of Computer Science Information Systems—Databases, ACM SIGMOD Record, vol. 20, Issue 2, Jun. 1991, 10 pages.

Wilkes, John, et al., *The HP AutoRAID hierarchical storage system*, ACM Transactions on Computer Systems, Feb. 1996, vol. 14, pp. 108-136.

U.S. Appl. No. 10/027,013, filed Dec. 21, 2001 by Alan L. Rowe et al. for a System and Method for Allocating Spare Disks in Networked Storage, all pages.

Elliott, Robert C., ed., "Information Technology-SCSI Block Commands-2 (SBC-2)," Working Draft American National Standard: Project T10/1417-D, Revision 16, T10 International Committee for Information Technology Standards (INCITS), Reference No. ISD/IEC 14776-322:200x, American National Standards Institute, Information Technology Industry Council, Nov. 13, 2004, pp. 1-145.

* cited by examiner

REDUCING RECONSTRUCT INPUT/OUTPUT OPERATIONS IN STORAGE SYSTEMS

FIELD OF THE INVENTION

The present invention pertains to storage systems, and more particularly, to optimizing data reconstruct operations.

BACKGROUND

A storage system is a processing system adapted to store and retrieve data on behalf of one or more client processing systems ("clients") in response to external input/output (I/O) requests received from clients. A storage system can provide clients with a file-level access to data stored in a set of mass storage devices, such as magnetic or optical storage disks or tapes. Alternatively, a storage system can provide clients with a block-level access to stored data, rather than file-level access or with both file-level access and block-level access.

Data storage space has one or more storage "volumes" comprising of a cluster of physical storage disks, defining an overall logical arrangement of storage space. The disks within a volume/file system are typically organized as one or more groups of Redundant Array of Independent (or Inexpensive) Disks (RAID). RAID implementations enhance the reliability and integrity of data storage through the redundant writing of data stripes across a given number of physical disks in the RAID group. When data can be read from the disks and written to the disks, it is said that the storage system operates in a normal mode.

In a storage system, data gets lost or corrupted from time to time, for example, upon the failure of one of the mass storage devices. Consequently, virtually all modern storage systems implement techniques for protecting the stored data. Currently, these techniques involve calculating a data protection value (e.g., parity) and storing the parity in various locations. Parity may be computed as an exclusive-OR (XOR) of data blocks in a stripe spread across multiple disks in a disk array. In a single parity scheme, e.g. RAID-4 or RAID-5, an error can be corrected in any block in the stripe using a single parity block (also called "row parity"). In a dual parity scheme, e.g., RAID Double Parity (RAID-DP), a technique invented by Network Appliance Inc. of Sunnyvale, Calif., errors resulting from a two-disk failure can be corrected using two parity blocks. The first one is a row parity block, which is computed as a result of XOR of data blocks in a stripe. The second one is diagonal parity, which may be computed as XOR of data blocks and a parity block in a diagonal set.

Referring now to FIGS. 1A and 1B, they show arrangements of data blocks on storage devices using parity blocks. In FIGS. 1A and 1B, data sent to a storage system from a client(s) for storage as part of a write operation may first be divided up into fixed-size, e.g., four Kilo Byte, blocks (e.g. D0, D1, etc.), which are then formed into groups that are stored as physical data blocks in a "stripe" (e.g. Stripe I, Stripe II, etc.) spread across multiple devices (e.g., disks) in an array. Row parity, e.g. an exclusive-OR (XOR) of the data in the stripe, is computed and may be stored in a parity protection block on disk D. The row parity, e.g., P(0-2), may be used to reconstruct a single lost or corrupted data block in Stripe I. The location of the row parity depends on the type of protection scheme or protocol implemented. FIG. 1A shows a RAID-4 scheme in which the row parity, e.g. P(0-2), P(3-5), P(6-8), and P(9-11) are stored in disk D. FIG. 1B shows a RAID-5 scheme in which the row parity is distributed across disks in the array. For example, P(0-2) is stored on Disk D, P(3-5) is stored on Disk C, P(6-8) is stored on Disk B, and P(9-11) is stored on Disk A.

Occasionally, disks experience an operational problem that either degrades disks' read-write performance or causes a disk failure. When a disk failure is detected, the storage system operates in a degraded mode. While operating in a degraded mode, the storage system services external I/O requests received from the clients as follows: if the requested data are stored on a failed disk, the storage system reads data from other disks (including the parity disk) and performs an exclusive OR (XOR) operation on the data that is being read to recover data that was stored on the failed disk. The result of the XOR operation is provided to the client. To service a write request to a failed disk while operating in a degraded mode, the storage system reads data from all data disks, other than the failed disk, XOR's the received data with the data being written, and writes the result of the XOR operation to a parity disk. While operating in a degraded mode, the storage system is vulnerable to data loss from another failure. In RAID-4, for example, if there is a two-disk failure, data cannot be recovered.

Conventionally, spare disks are used to replace failed disks. A spare disk is a disk held in reserve to which data and parity are not written during normal I/O operations. Spare disks can be global spare disks that can be used by any RAID group. Alternatively, spare disks can be dedicated ones, i.e., they are part of a particular RAID group. To choose an appropriate spare disk, various factors are taken into account, such as type of the spare disk (e.g., FC, Advanced Technology Attachment (ATA), etc), disk's revolutions per minute (RPM), disk checksum type, and disk capacity. A person of ordinary skill in the art would understand that other parameters can be used by a storage system to pick a spare disk.

Once the storage system replaces the failed disk with the spare disk, it begins a process of reconstructing data from the failed disk. The reconstruction process can be performed intermittently with normal I/O operations. The process of data reconstruction involves reading data from all disks other than the failed disk, XOR'ing the data being read, and writing the result of the XOR operation to a spare disk, which becomes a reconstructing disk once it replaces the failed disk. Thus, to reconstruct data in a stripe, multiple read operations and at least one write operation have to be performed. Performing multiple read operations during the reconstruct process results in rotation latency, thereby increasing overall time required to perform a reconstruct process. In addition, performance of the storage system suffers during reconstruct time since regular I/O operations are performed at the same time. Furthermore, if during a reconstruct process a second disk fails, or has a media error, it is impossible to reconstruct data in RAID-4 or RAID-5. In a dual parity RAID array with two failed drives and a third drive failure or a media error on a third disk, some or all data would not be recoverable.

Accordingly, what is needed is a method and system that reduces the number of I/O operations required to reconstruct a failed disk to a spare disk, thereby reducing the time for reconstructing the failed disk.

SUMMARY OF THE INVENTION

The present invention provides a system, method, and computer program product for partially pre-writing data stored in an array of mass storage devices to a spare disk dedicated to the array prior to detecting a failure in the array. The system then reconstructs data from the failed disk using data partially pre-written to the spare disk. Since some of the data has already been pre-written to the spare disk, embodiments of the present invention reduce the number of I/O operations performed by a storage system during a process of reconstructing data from the failed disk to the spare disk. This, in turn, adds data resiliency to the array, eliminates some rotation latency, and increases overall performance of the storage system.

In one embodiment (referred to herein as "Alternating Data Method"), the storage system pre-writes, to a spare disk, data from one disk in the array for each stripe prior to the disk failure according to an algorithm described herein. Since the data from one disk in each stripe is pre-written to a spare disk, when a disk failure is detected, some of the stripes do not need to be reconstructed at all. As a result, the number of I/O operations performed by the storage system to reconstruct a failed disk is reduced.

In another embodiment (referred to herein as a "Partial Parity Method"), the storage system pre-writes, to a spare disk, prior to a disk failure, a result of an application of a logical operation on two or more data blocks in a stripe. According to yet another embodiment, the storage system further reduces the number of I/O operations by having a spare disk, rather than the storage system, compute data from the failed disk using data pre-written to the spare disk and data received, via the storage system, from other disks in the array. As a result, the need for reading, by the storage system, data pre-written to the spare disk is eliminated.

Although in a preferred embodiment data is pre-written to a spare disk when the storage system is in an idle state, i.e., a period during which a relatively low number of write and read requests are originated from clients, a person of ordinary skill in the art would understand that data can be pre-written to the spare disk any time prior to a disk failure. For example, data can be pre-written to a spare disk during an otherwise conventional operation during which data is read from a disk array, e.g., for parity checking purpose.

Furthermore, the present invention provides for recovery of data in RAID-4 and RAID-5 when one disk failed and data cannot be read from one or more data blocks in another disk (i.e., that disk has a media error).

Other aspects of the invention will become apparent from the following detailed description taken in conjunction with the accompanying drawings, which illustrate the principles of the invention by way of example.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

The present invention provides a system, method, and computer program product for partially pre-writing data stored in an array of mass storage devices to a spare disk dedicated to the array prior to detecting a failure in the array. The system then reconstructs data from the failed disk using data partially pre-written to the spare disk. Since some of the data has already been pre-written to the spare disk, embodiments of the present invention reduce the number of I/O operations performed by a storage system during a process of reconstructing data from the failed disk to the spare disk. This, in turn, adds data resiliency to the array, eliminates some rotation latency, and increases overall performance of the storage system.

1. System Environment

Figure 1A:
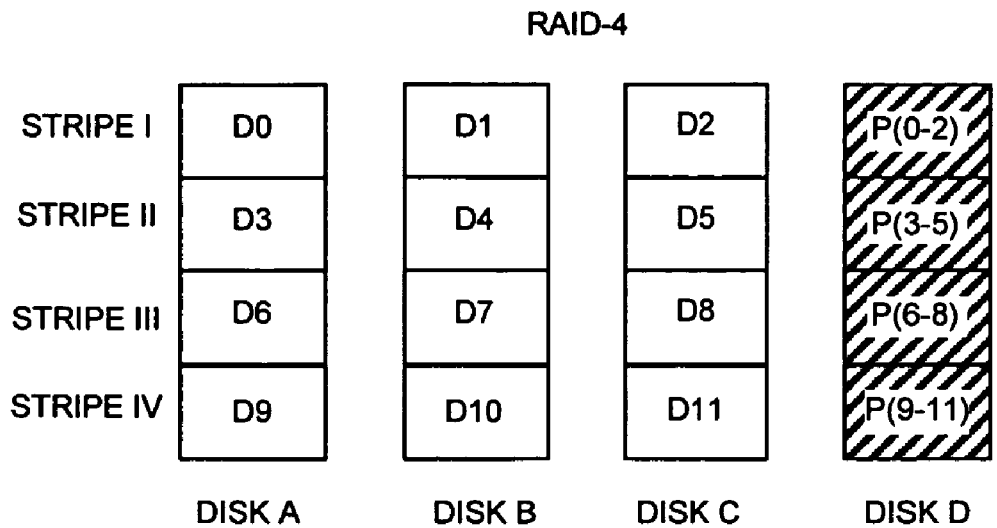
FIGS. 1A and 1B show arrangements of data blocks on disks according to RAID-4 and RAID-5.
Figure 1B:
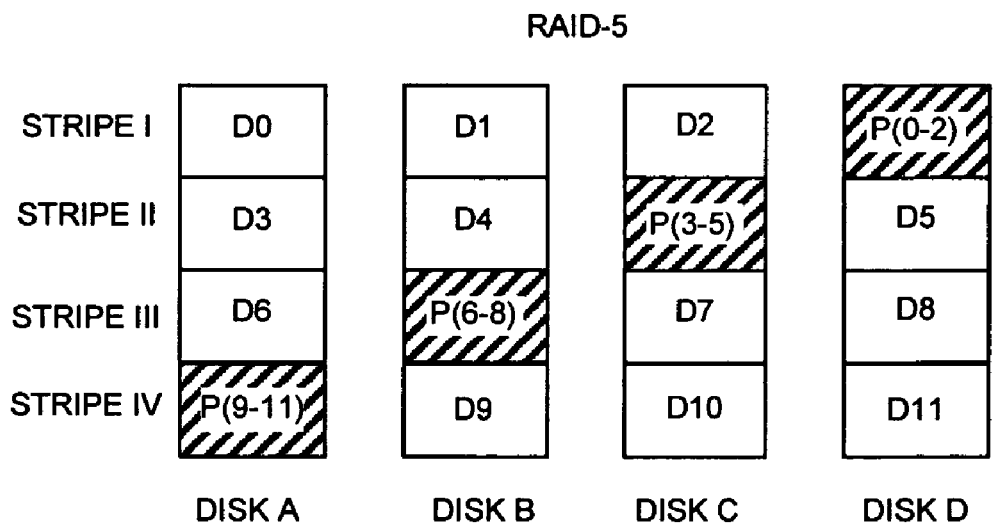
Figure 2:
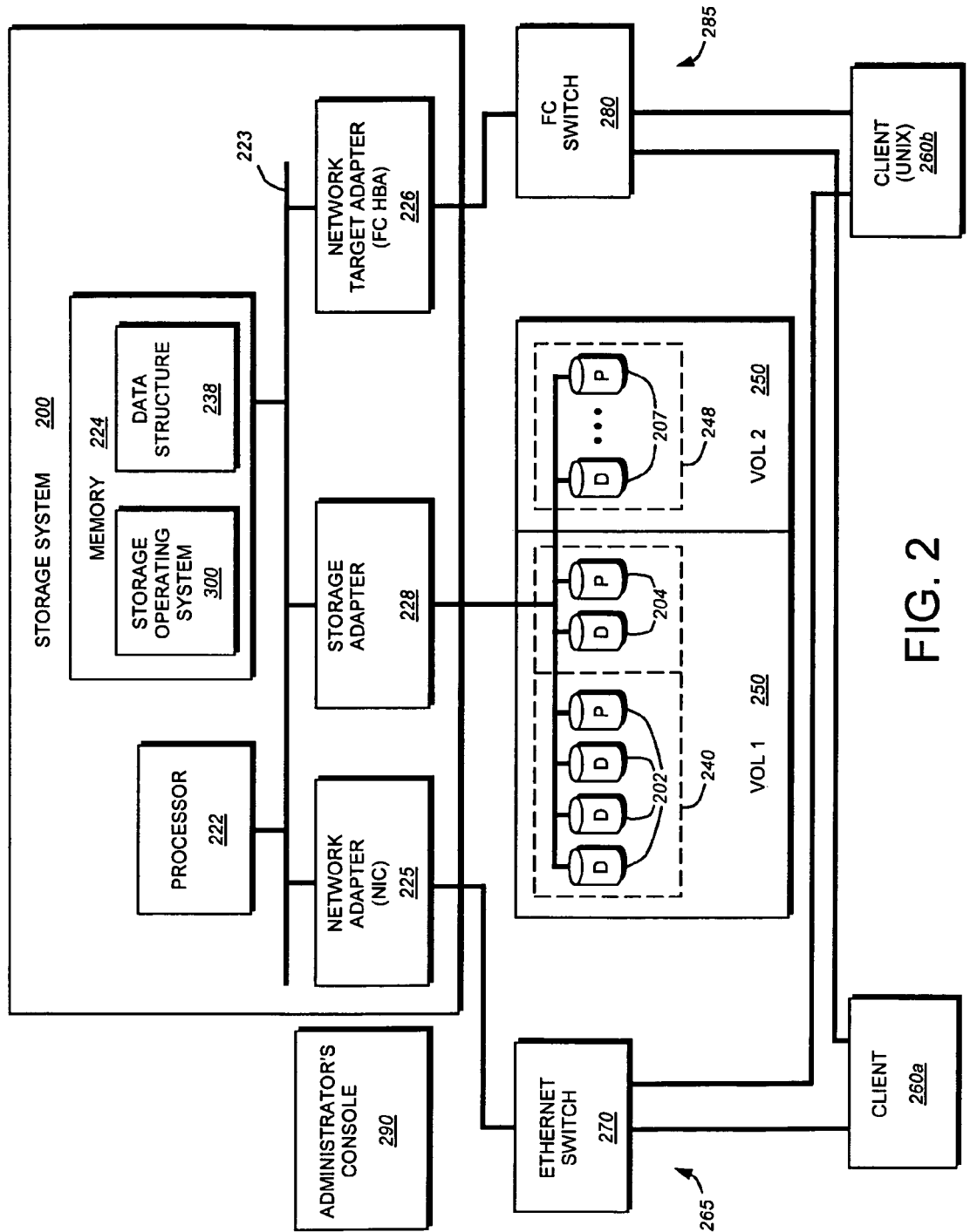
FIG. 2 shows network environment that includes a storage system according to an embodiment of the present invention.
Figure 3:
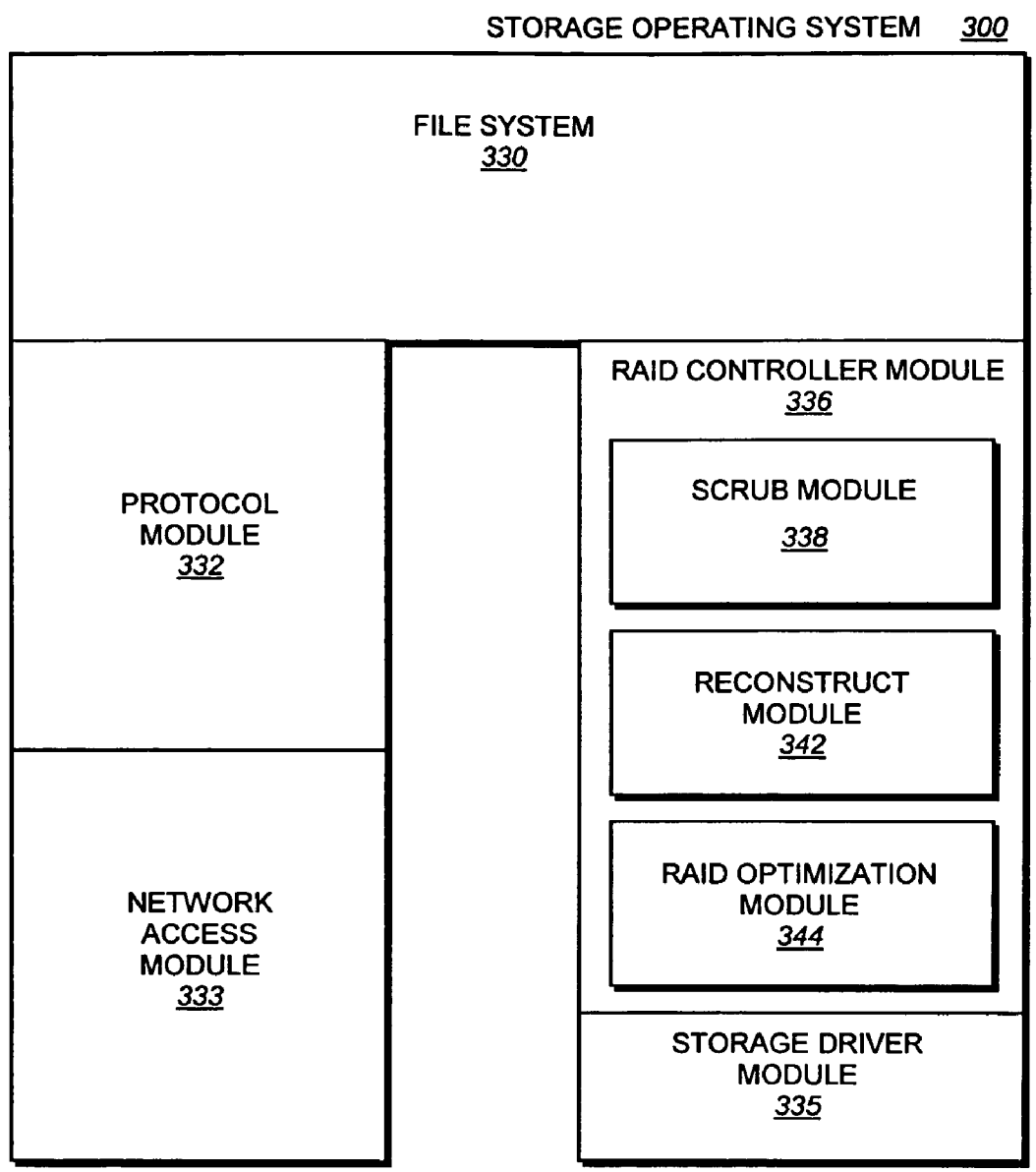
FIG. 3 is a diagram showing storage operating system of the storage system of FIG. 2 according to an embodiment of the present invention.

FIG. 2 is a schematic block diagram of a storage system 200 according to an embodiment of the present invention. The storage system 200 is configured to provide storage service for both file and block protocol access to information stored on storage devices in an integrated manner. The storage system 200 is illustratively embodied as a system comprising a processor 222, a memory 224, a plurality of network adapters 225, 226 and a storage adapter 228 interconnected by a system bus 223. The storage system 200 also includes a storage operating system 300 that includes a virtualization system including a file system (such as file system 330 shown in FIG. 3) to logically organize the information as a hierarchical structure of named directories, file and virtual disk (vdisk) storage objects on disk drives 202 (also referred to herein as "disks").

Whereas clients of a NAS-based network environment have a storage viewpoint of files, the clients of a SAN-based network environment have a storage viewpoint of blocks or disks. To that end, the storage system 200 presents (exports) disks to SAN clients through the creation of logical unit numbers (luns) or vdisk objects.

In the illustrative embodiment, the memory 224 comprises storage locations that are addressable by the processor 222 and adapters 225, 226, and 228 for storing software program code and data structures. Memory 224 also stores a data structure 238 indicating whether data on a spare disk are valid. In one embodiment, data structure 238 is implemented as a bitmap in which a value of "1" may indicate that data on a spare disk for a particular stripe are valid. A value of "0" (zero) may indicate that data on a spare disk for a particular stripe are not valid. When data is pre-written to a spare disk during a scrub operation, data structure 238 is updated to indicate that pre-written data are valid. When blocks in a stripe are modified as the result of an external client I/O operation, data structure 238 is updated to indicate that data on the spare disk for that stripe are not valid.

The processor 222 and adapters 225, 226, and 228 may comprise processing elements and/or logic circuitry configured to execute the software code and manipulate the data structures. The storage operating system 300 portions of which are typically resident in memory 224 and executed by the processing elements, functionally organizes the storage system 200 by, inter alia, invoking storage operations in support of the storage service implemented by the storage system 200.

The network adapter 225 couples the storage system 200 to a plurality of clients 260 a,b over point-to-point links, wide area networks (WAN), virtual private networks implemented over a public network (Internet) or a shared local area network, hereinafter referred to as an illustrative Ethernet network 265. For a NAS-based network environment, the clients 260 a,b are configured to access information stored on the storage system 200 as files. Therefore, the network adapter 225 may comprise a network interface card (NIC) having the mechanical, electrical and signaling circuitry needed to connect the storage system 200 to a network switch, such as a conventional Ethernet switch 270. The clients 260 communicate with the storage system 200 over network 265 by exchanging discrete frames or packets of data according to pre-defined protocols, such as the Transmission Control Protocol/Internet Protocol (TCP/IP).

The clients 260 a, b may be general-purpose computers configured to execute applications over a variety of operating systems, including the UNIX® and Microsoft® Windows™ operating systems. Clients generally utilize file-based access protocols when accessing information (in the form of files and directories) over a NAS-based network. Therefore, each client 260 may request the services of the storage system 200 by issuing file access protocol messages (in the form of packets) to the storage system 200 over the network 265. For example, client 260a running the Windows operating system may communicate with the storage system 200 using the Common Internet File System (CIFS) protocol over TCP/IP. On the other hand, client 260b running the UNIX operating system may communicate with the multi-protocol storage system 200 using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the storage system 200 using other file access protocols.

The storage network "target" adapter 226 also couples the storage system 200 to clients 260 a,b that may be further configured to access the stored information as blocks or disks. For this SAN-based network environment, the storage system 200 is coupled to an illustrative Fibre Channel (FC) network 285. FC is a networking standard describing a suite of protocols and media that is primarily found in SAN deployments. The network target adapter 226 connects the storage system 200 to a SAN network switch, such as a conventional FC switch 280.

The clients 260 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as the disk drives 202, to attach to the storage system 200.

The storage adapter 228 cooperates with the storage operating system 300 executing on the storage system 200 to access information requested by the clients 260. The information may be stored on the disk drives 202 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 222 (or the adapter 228) prior to being forwarded over the system bus 223 to the network adapters 225, 226, where the information is formatted into packets or messages and returned to the clients 260.

Storage of information on the storage system 200 is preferably implemented as one or more storage volumes (e.g., VOL1 and VOL2 250) that comprise a cluster of physical storage disk drives 202 defining an overall logical arrangement of disk space. The disks within a volume are typically organized as one or more RAID groups 240 and 244 shown in FIG. 2. The physical disks of each RAID group include those disks configured to store striped data (D) and those configured to store parity (P) for the data, in accordance with an illustrative RAID-4 level configuration. However, other RAID level configurations (e.g. RAID-5) are also contemplated. In the illustrative embodiment, a minimum of one parity disk and one data disk may be employed. However, a typical implementation may include three data and one parity disk per RAID group and at least one RAID group per volume.

In addition, volume 250 includes a plurality of disks that are not currently being utilized by the storage system 200 in a volume. These non-utilized disks are designated as "spare" disks 204 that can be used by storage system 200 in the event of a disk failure on a volume, or to create new volumes or expand existing volumes. Using a spare disk to replace a failed disk allows the storage operating system 300 to then reconstruct the data onto the spare disk(s) 204 using the processes defined within the RAID standards. Spare disks that are available for any RAID group are called global spare disks. Spare disks that are available for a particular RAID group are called dedicated spare disks. The process for selecting spare disks should not override the significant desire to reconstruct the volume containing the failed disk as soon as possible, thereby avoiding the possibility of another disk failure and causing an undesirable double disk failure. A mechanism for spare disk allocation is described in U.S. patent application Ser. No. 10/027,013, entitled "SYSTEM AND METHOD FOR ALLOCATING SPARE DISKS IN NETWORKED STORAGE," by Alan L. Rowe, et al, the disclosure of which is incorporated herein by reference in its entirety.

2. Storage Operating System

In the illustrative embodiment, the storage operating system 300 is preferably the NetApp® Data ONTAP™ operating system available from Network Appliance Inc., of Sunnyvale, Calif., that implements a Write Anywhere File Layout (WAFL™) file system. However, it is expressly contemplated that any appropriate storage operating system, including a write in-place file system, may be enhanced for use in accordance with the inventive principles described herein to facilitate access to disk drives 202. As such, where the term "WAFL" is employed, it should be taken broadly to refer to any storage operating system that is otherwise adaptable to the teachings of this invention. As used herein, the term "storage operating system" generally refers to the computer-executable code operable on a computer that manages data access. The storage operating system can be implemented as an application program operating over a general-purpose operating system, such as UNIX® or Windows NT®, or as a general-purpose operating system with configurable functionality, which is configured for storage applications as described herein.

The file system 330 "virtualizes" the storage space provided by the disk drives 202. The file system 330 logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored.

Storage operating system 300 further includes a protocol module 332, a network access module 333, a RAID controller module 336, and a storage driver module 335.

The protocol module 332 implements one or more of various high-level network protocols, such as Network File System (NFS), Common Internet File System (CIFS), Hypertext Transfer Protocol (HTTP) and/or Transmission Control Protocol/Internet Protocol (TCP/IP) to encode incoming client requests or encode outgoing response to the client requests in the appropriate protocol. The network access module 333 includes one or more drivers which implement one or more lower-level protocols to communicate over the network, such as Ethernet. The protocol module 332 and the associated network access module 333 allow the storage system 200 to communicate with clients 260 a, b.

Storage driver module 335 allows storage system 200 to communicate with the disks 202. The storage driver module 335 may implement a lower-level storage device access protocol, such as Fibre Channel Protocol (FCP) or SCSI.

RAID controller module 336 (also referred to herein as a "storage module") manages data storage and retrieval in response to I/O requests from clients 260. In one embodiment, RAID controller module 336 can be a software module executed on the storage system 200. In an alternative embodiment, RAID controller module 336 can be a separate controller implemented as hardware. RAID controller module 336 further maintains data structures for each RAID group (these data structures are not shown in FIG. 3). A data structure for a RAID group points to one or more disk data structures that identify disks included in the RAID group. A disk data structure (not shown in FIG. 3) may include a type of a disk, the disk's serial number, the disk's location, the disk's size, and a handle to identify the disk that is used when sending requests to storage driver module 335. RAID controller module 336 identifies a failed disk by receiving an error code from storage driver module 335. Such errors are conventionally generated as provided by disk drives' manufacturers. When the failed disk is detected, the RAID controller module 336 puts the RAID group in which the failed disk was detected in the degraded mode. According to an embodiment of the present invention, RAID controller module 336 logically replaces the failed disk with the spare disk, which was configured as part of the RAID group where the disk failure was detected. In one embodiment, to logically replace the failed disk with the spare disk, RAID controller module 336 removes a data structure for the failed disk from a data structure for a RAID group that included the failed disk. RAID controller module 336 adds a data structure for the spare disk to the RAID group data structure.

RAID controller module 336 further includes a scrub module 338 and a reconstruct module 342, the operations of which are described herein.

Scrub module 338 may check the validity of data stored on disks. Scrub module 338 may verify a checksum(s) of the received data as described herein. A checksum is a calculated value used to verify data integrity when data are written to a disk(s). Scrub module 338 may also verify validity of parity for a particular stripe on a disk as will be described in more detail herein.

Scrub module 338 also reconstructs data when a media error is detected on a disk. A media error on a disk occurs when data cannot be read from a particular block or a number of blocks from a disk. Scrub module 338 runs a scrub process when storage system 200 is in idle state, i.e., when a relatively low number of external I/O operations are originated from clients 260 a,b (such as during weekends, holidays, and other off-peak hours).

In one embodiment, a scrub process is initiated by a system administrator operating at a system administrator' console 290 connected to storage system 200 (shown in FIG. 2). The system administrator enters a command(s) via console 290 to initiate a scrub process using the Command Line Interface (CLI). The storage operating system 300 receives the command and causes scrub module 338 to execute a scrub process. In an alternative embodiment, a system administrator enters a command via console 290 to run a scrub process at a later time according to a schedule provided by the system administrator. In this embodiment, the operating system 324 receives the command and causes scrub module 338 to run a scrub process according to the schedule. The initiated scrub process as well as a reconstruct process described herein are internal I/O operations initiated by storage system 200.

Scrub module 338 verifies checksums as follows. RAID controller 336 writes data to disk(s) along with a checksum(s). The checksum can be computed by sequentially combining all the bytes of data for a block (e.g., 4 Kb) with a series of arithmetic or logical operations. Scrub module 338 reads the data from disk(s), calculates new checksums, and compares the computed checksum with the one originally sent with the data to determine whether the data written to disk(s) are valid.

Scrub module 338 also determines whether there is a media error on a disk(s). If a particular data block cannot be read due to a media error, scrub module 338 reconstructs the data by XOR'ing data from other disks and writing the result of the XOR operation to the data block that has a media defect or to another block if the block that has a media error cannot be written.

Scrub module 338 is further adapted to check parity for correctness to ensure that the parity for a particular stripe is consistent with the data blocks in the stripe. To this end, in RAID-4 implementation, scrub module 338 reads all data blocks across a stripe on disk(s), reads a corresponding parity block, performs an XOR operation on the data, and compares the result of the XOR operation with the parity block. If the two match, the parity is correct. Alternatively, if the two do not match, scrub module 338 writes the computed parity to the parity block.

According to an embodiment of the present invention, to avoid performing multiple read operations by reconstruct module 342, scrub module 338 partially pre-writes data in a particular stripe to a spare disk dedicated to a RAID group before a disk failure is detected in the RAID group. In one embodiment, data from one disk for each stripe is pre-written to a spare disk during a scrub operation. A person of ordinary skill in the art would understand that the data can be pre-written to the spare disk during normal I/O operations as well.

According to another embodiment, a logical operation is applied on two or more data blocks in a stripe and a result of the logical operation is pre-written to a spare disk prior to the disk failure being detected. In one embodiment, the logical operation is XOR, although the present invention contemplates using other logical operations that produce a similar result or other usable result. Since some of the data are already pre-written onto a spare disk prior to detecting the disk failure, the need for reading data from all disks in the array during reconstruction is eliminated. As such, it would require fewer number of I/O operations, thereby decreasing the time needed to reconstruct data.

Reconstruct module 342 is adapted to reconstruct data stored on the failed disk onto the spare disk using the data pre-written to the spare disk using techniques according to various embodiments of the present invention as described herein. As was previously described, conventionally, the process of reconstructing the data in each stripe involves reading data from all disks other than the failed disk, XOR'ing the data, and writing the result of the XOR operation onto a spare disk for the reconstructing stripe. Thus, to reconstruct data in each stripe, one write operation and multiple read operations would have to be performed. Performing multiple read operations during the reconstruct process results in rotation latency, thereby increasing overall time required to perform a reconstruct process. According to one embodiment of the present invention, since data from some of the disks are pre-written to a spare disk, some of the stripes do not need to be reconstructed at all. According to another embodiment, since a result of an application of a logical operation on two or more data blocks in a stripe is pre-written to a spare disk, it eliminates the need for reading data from all the disks to reconstruct the failed disk.

According to yet another embodiment, the spare disk responds to the command issued by RAID optimization module 344 (shown in FIG. 3) by computing data from the failed disk using data pre-written to the spare disk and data received via storage system 200 from other disks in the array. As a result, the need for reading, by the RAID controller module 336, data pre-written to the spare disk is eliminated. In one embodiment, the command is XPWrite command provided by Small Computer Systems Interface (SCSI) standard, described in SCSI Block Commands, second generation, published draft of Nov. 13, 2004 from the T10 Technical Committee for Information Technology Standards, which is incorporated fully herein by reference (see www.t10.org). Although the present invention will be described in the context of XPWrite command, a person of ordinary skill in the art would understand that other commands can be used to implement the present invention.

Various embodiments for reducing the number of I/O requests to reconstruct data from a failed disk onto a spare disk are described herein.

3. Methods of Operation

A. Alternating Data Method

Figure 4:
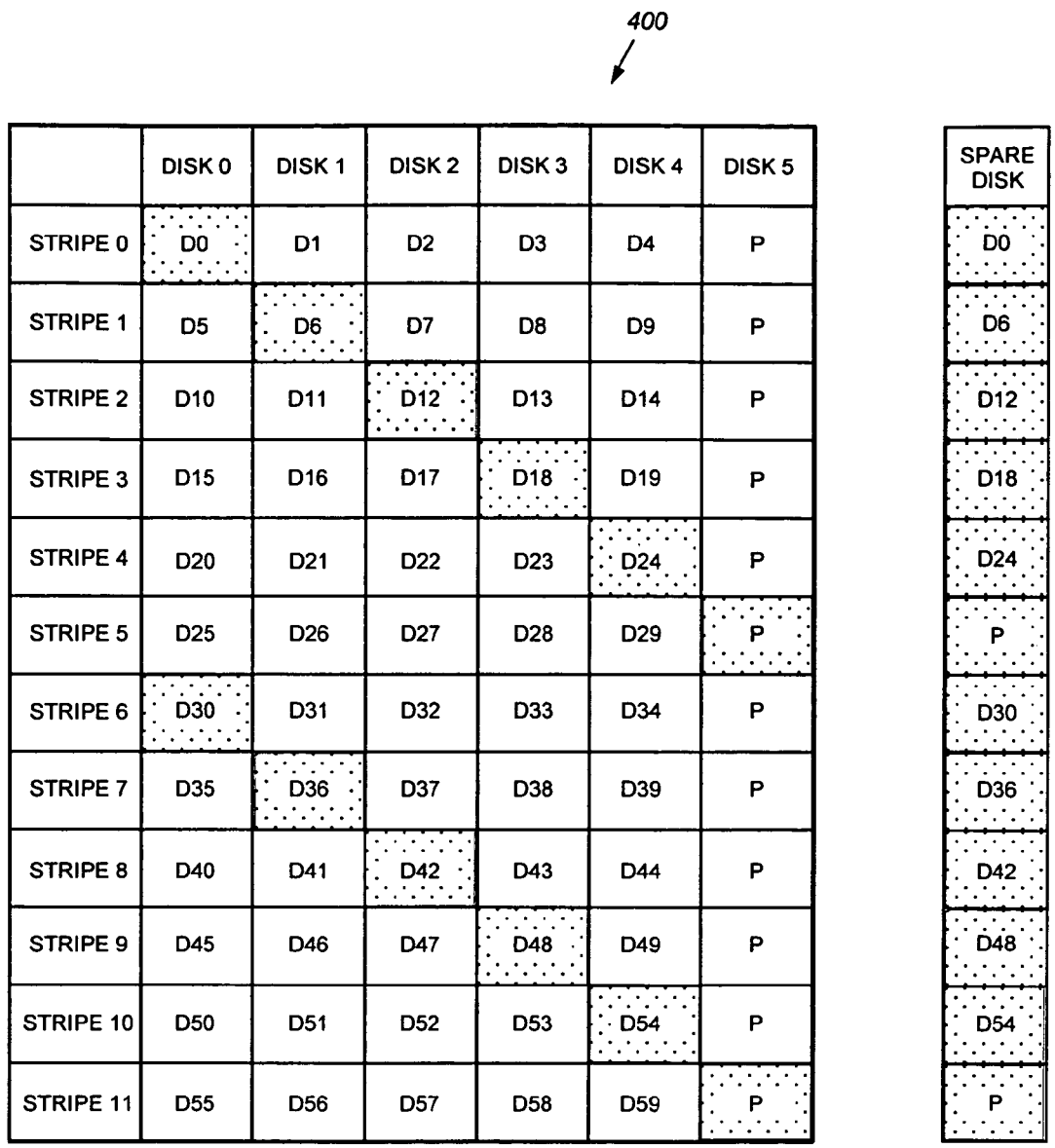
FIG. 4 is an example of an alternating data method for pre-writing data to a spare disk prior to a disk failure.

Referring now to FIG. 4, it illustrates a six-drive RAID-4 array. In the array, data is stored across Disks 0 through Disk 4. There are twelve stripes (Stripe 0 through Stripe 11) in the array shown in FIG. 4. Disk 5 stores parity for each stripe in the array. According to an embodiment of the present invention, during a scrub operation, scrub module 338 alternates pre-writing data for each stripe from Disk 0, Disk 1, Disk 2, Disk 3, Disk 4, and Disk 5 onto a spare disk so that in each stripe data from one disk is pre-written onto a spare disk. This ensures that data from each disk is pre-written to a spare disk. To identify a disk from which data is to be pre-written to a spare disk 204 for a particular stripe, the following algorithm can be used: Disk # is equal to Stripe # Modulo Total Number of Disks.

The application of the above algorithm is shown below:
0 modulo 6=0
1 modulo 6=1
2 modulo 6=2
3 modulo 6=3
4 modulo 6=4
5 modulo 6=5
6 modulo 6=0
7 modulo 6=1
8 modulo 6=2
9 modulo 6=3
10 modulo 6=4
11 modulo 6=5

As a result of pre-writing data according to this method, spare disk 204 stores data from Disk 0 in Stripe 0, Disk 1 in Stripe 1, Disk 2 in Stripe 2, Disk 3 in Stripe 3, Disk 4 in Stripe 4, Disk 5 in Stripe 5, Disk 0 in Stripe 6, Disk 1 in Stripe 7, Disk 2 in Stripe 8, Disk 3 in Stripe 9, Disk 4 in Stripe 10, and Disk 5 in Stripe 11. A person of ordinary skill in the art would understand that the above algorithm for pre-writing data to a spare disk prior to a disk failure is an exemplary algorithm and other algorithms can be used.

1) Scrub Operation

Figure 6:
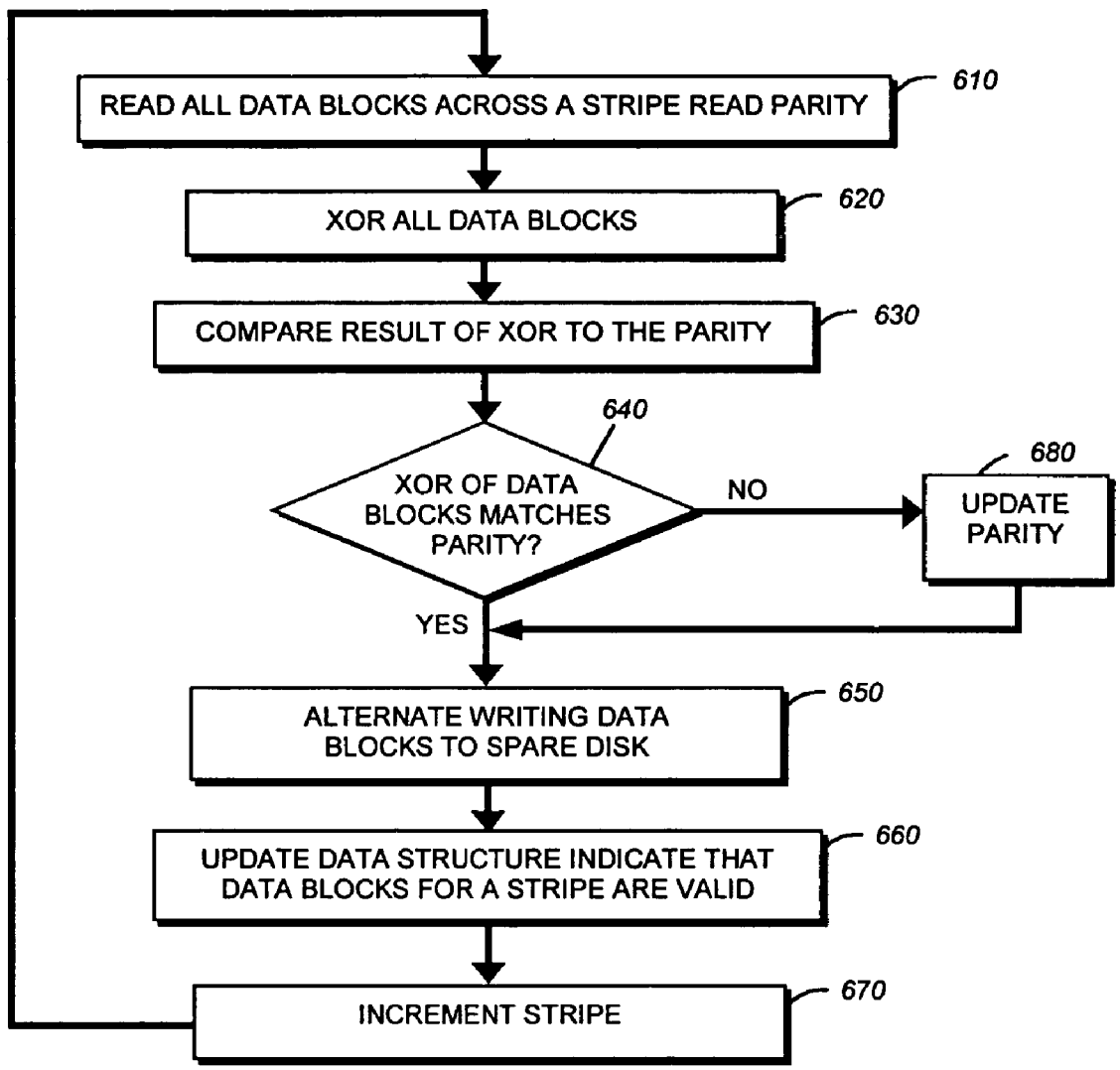
FIG. 6 is a flow diagram of the steps performed for pre-writing data to a spare disk prior to a disk failure according to the embodiment of FIG. 4.

FIG. 6 is a flow diagram of the steps performed by scrub module 338 to pre-write data from disks in a RAID group to a dedicated spare disk before a disk failure is detected in the RAID group.

As was described herein, scrub module 338 runs a scrub process when storage system 200 is in an idle state, i.e., a period of time during which a relatively low number of I/O operations are originated from clients.

Initially, at step 610, scrub module 338 starts with the first stripe, e.g., Stripe 0, and reads all data blocks in Stripe 0. Scrub module 338 also reads a parity block in Stripe 0. At step 610, all data blocks are XOR'ed. Scrub module 338 compares 630 the result of the XOR operation with the read parity block. If the two match at step 640, scrub module 338 starts writing data to a spare disk. As described herein, in one implementation, to identify the disk number from which data is pre-written to a spare disk for a particular stripe, the following algorithm is used: Disk #=Stripe # Modulo Total Number of Disks. A person of ordinary skill in the art would understand that the above algorithm was chosen as an example and other algorithms can be used to pre-write data to a spare disk prior to a disk failure. At step 660, data structure 238 is updated to indicate that data pre-written to a spare disk for the stripe are valid. Scrub module 338 increments the stripe number at step 670 and continues with the steps 610-670 until it reaches the last stripe.

If in step 640 the result of the XOR operation on the data blocks does not match the parity, scrub module 680 updates the parity and loops to step 650.

(2) Reconstruct Operation

As described herein, when a disk failure occurs, RAID controller module 336 identifies a failed disk by receiving an error code from storage driver module 335 in response to a request sent to the storage driver module. When the failed disk is detected, the RAID controller module 336 logically replaces the failed disk with the dedicated spare disk to which data was pre-written. This replacement permits the storage operating system 330 to then reconstruct the data onto the spare disk during a reconstruct process. Until the data reconstruction is completed, storage system 200 operates in a degraded mode.

Conventionally, reconstruction of data in a six-drive array requires five read operations and one write operation for each stripe. For example, assume Disk 0 failed, reconstruct module 342 would have to perform the following operations to reconstruct data in Stripe 0:

Read D1, D2, D3, D4, and P

XOR (D1, D2, D3, D4, and P)

Write result of the XOR to a spare disk for Stripe 0.

According to an embodiment of the present invention, if Disk 0 fails, Stripe 0 and Stripe 6 do not need to be reconstructed since data from Disk 0 for Stripe 0 and Stripe 6 is stored on a spare disk. When a disk fails, since $1/6^{th}$ of data in each stripe is pre-written to a spare disk, $1/6^{th}$ of data may be valid and will not need to be reconstructed at all. As a result, reconstruct module 342 would not need to read data from disks in that stripe or write to the reconstructing disk for that stripe.

It should be noted that as external client access requests are received by storage system 200, data stored Disk 0 through Disk 5 may be updated. Thus, data pre-written to a spare disk during a scrub operation may become obsolete. If the data is modified on the disks, data structure 238 is updated on each external write request after a last scrub operation to indicate that data pre-written to a spare disk is not valid. During a reconstruct operation, the details of which will be described in more detail in reference to FIG. 7, reconstruct module 342 checks the validity of data pre-written to a spare disk for each stripe. If the data in a particular stripe are not valid, reconstruct module 342 reconstructs data onto a spare disk for that stripe according to a conventional technique. If, for example, the spare disk is checked and pre-written on a weekly basis and 20% of data in a RAID group changes over a period of time, such as a week, then at any time between 80% and 100% data stored on the spare disk will be valid.

Figure 7:
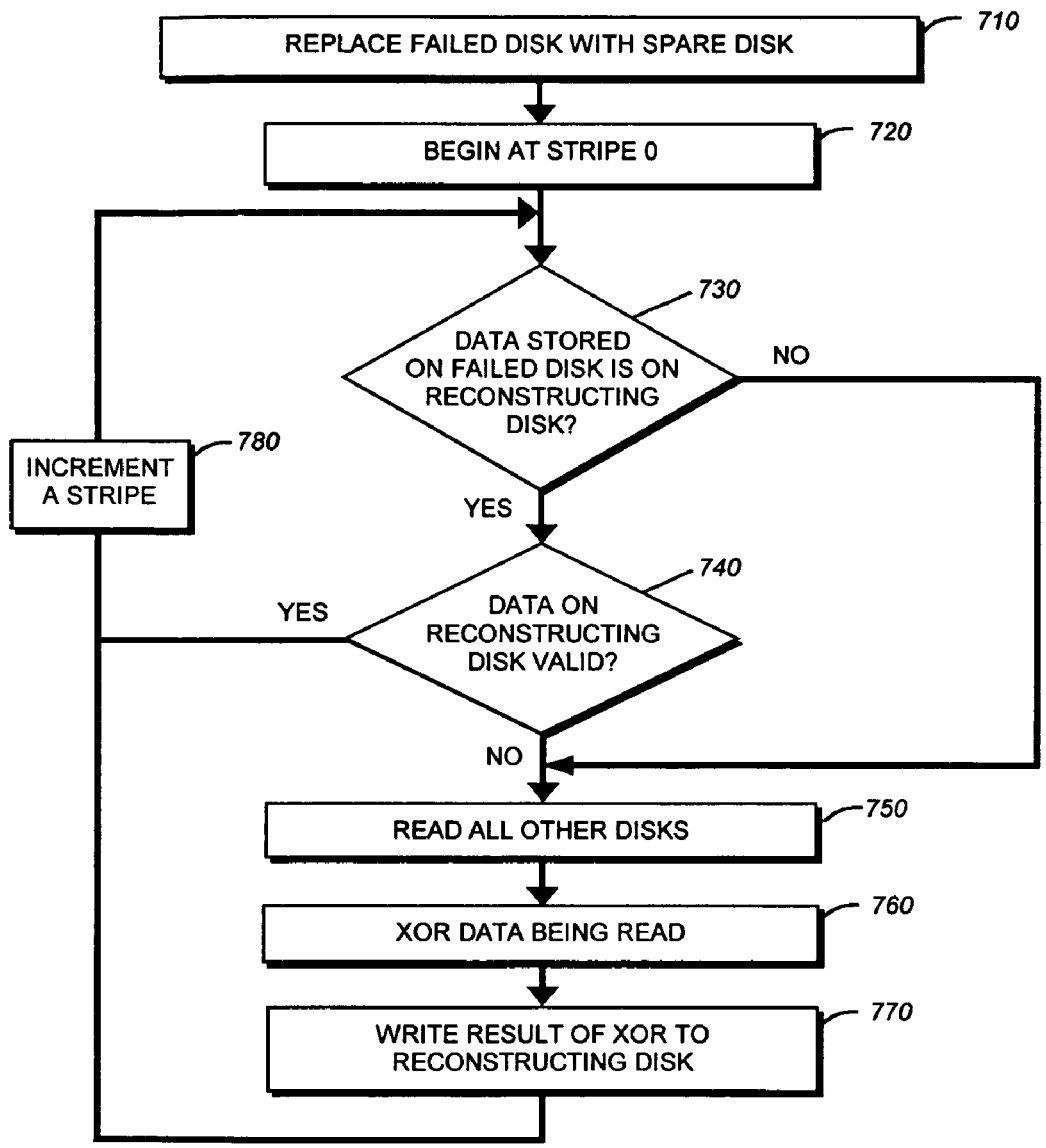
FIG. 7 is a flow diagram of the steps performed during a reconstruct process according to the embodiment of FIG. 4.

Referring now to FIG. 7, it illustrates a flow diagram of a method performed by a reconstruct module 342 according to an embodiment of the present invention to reconstruct data. Initially, a disk failure is detected. At step 710, the failed disk is replaced with a spare disk to which data was pre-written prior to the reconstruct operation. The spare disk becomes a reconstructing disk. Then a reconstruct process begins.

Reconstruct module 342 begins at step 720 starting from the first stripe, e.g., Stripe 0. At step 730, module 342 determines whether data stored on a failed disk was pre-written to the reconstructing disk during a scrub operation for the reconstructing stripe (e.g., Stripe 0). To this end, reconstruct module 342 invokes the algorithm that was used during the scrub operation to identify a disk number to which data on the spare disk belongs. If the reconstructing disk stores data from the failed disk, reconstruct module 342 uses data structure 238 to determine at step 740 whether data pre-written to the reconstructing disk for the reconstructing stripe are valid. If the data pre-written to the reconstructing disk are valid, then there is no need to read that data from other disks since the data from the failed disk has been reconstructed to the reconstructing disk. Thus, the process increments a stripe at step 780 and loops back to step 730 to analyze the next stripe.

Alternatively, if the data on a reconstructing disk are not valid, reconstruct module 342 uses a conventional technique for reconstructing data. Module 342 reads data from all other disks at step 750, XOR's the data at step 760, and writes the result of the XOR operation to the reconstructing disk, at step 770. The process increments a stripe at step 780 and loops back to 730 to analyze the next stripe.

Thus, according to this embodiment, if the data from one disk in each stripe is pre-written to a spare disk during a scrub operation prior to a disk failure in an array and the data are valid, reconstruct module 338 does not need to reconstruct data for those stripes in which data from the failed disk is pre-written to the spare disk during a scrub process.

Figure 5:
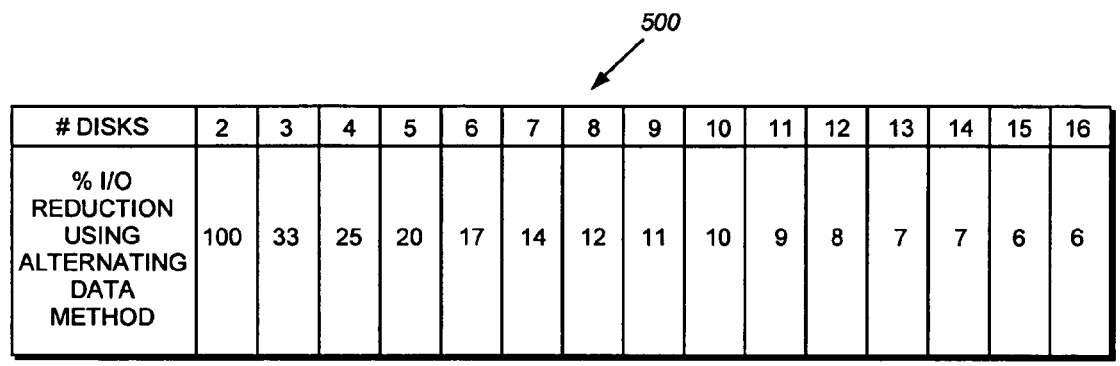
FIG. 5 is a table illustrating improvements in reducing the number of I/O operations performed during a reconstruct process according to the embodiment shown in FIG. 4.

Referring now to FIG. 5, it illustrates a table 500 that shows performance achieved by storage system 200 using an alternating method for pre-writing data to a spare disk during a scrub operation. Each column represents a number of Disks (2 through 16) in an array. Each row represents a percentage of I/O reduction in reconstructing data using the technique described in FIG. 4. As shown in FIG. 5, with a six-drive array, which is a typical number of disks in a RAID group, 17% of the stripes do not need to be reconstructed since the data are already pre-written to a spare disk during a scrub process. This significantly reduces the time to reconstruct data from a failed disk to a reconstructing disk.

Moreover, the present invention provides for recovery of data in RAID-4 when one disk is failed and another disk has a media error. Referring again to FIG. 4, assume that Disk 0 has a disk failure and Disk 1 has a media error in Stripe 0. If D0 is pre-written to a spare disk prior to a disk failure, the present invention provides for recovery of D1, if D1 cannot be read, due to, for example, a media error. To recover D1, reconstruct module 342 performs the following steps:

Read D0 from the spare, and read D2, D3, D4, and P

XOR (D0, D2, D3, D4, and P).

The result of XOR is data stored on Disk 1 in Stripe 0.

B. Partial Parity Method

(1) Scrub Operation

Figure 8:
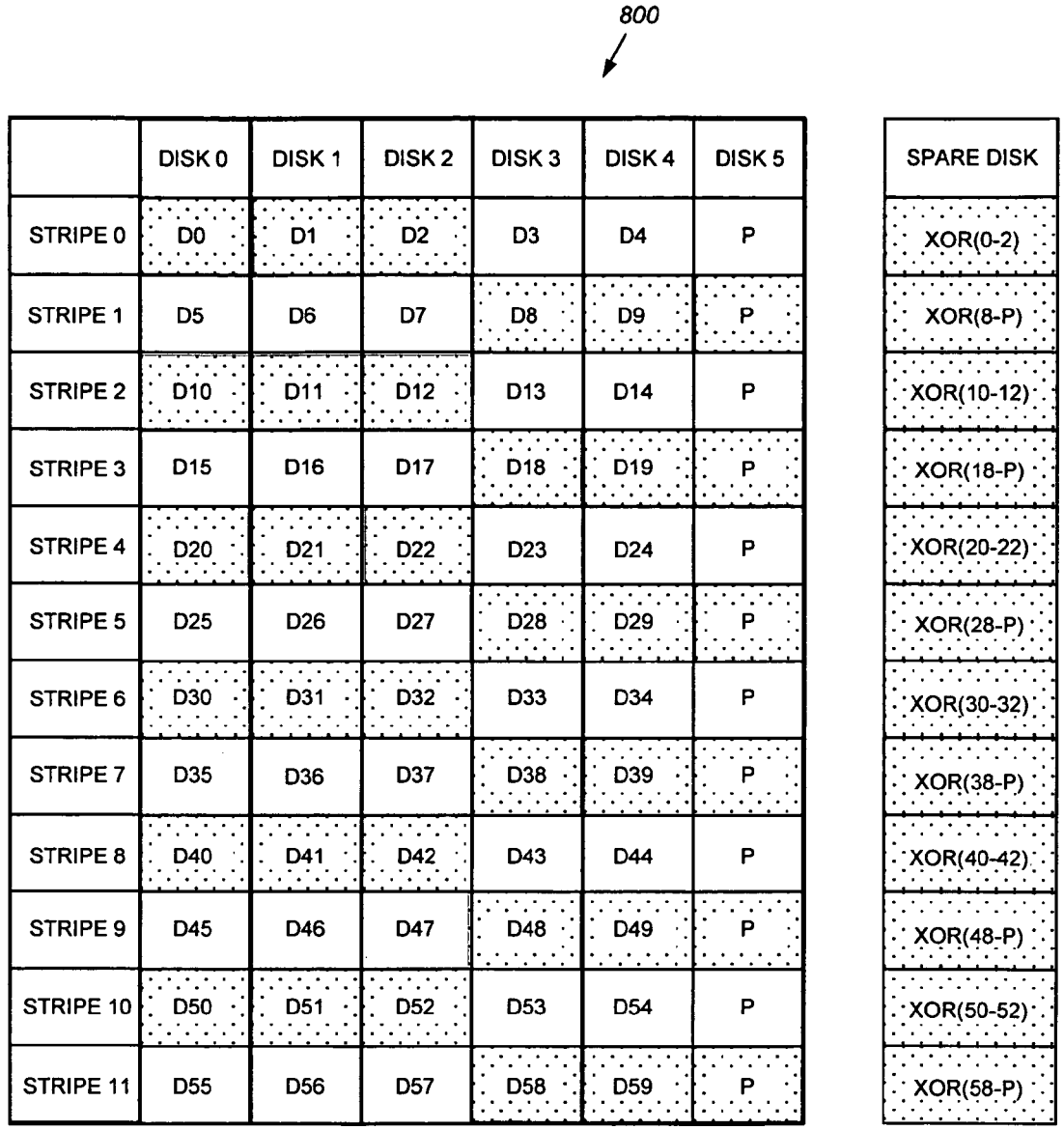
FIG. 8 is an example of a partial parity method for pre-writing data to a spare disk prior to a disk failure.

Referring now to FIG. 8, it illustrates a six-drive RAID-4 array. In the array 800, data is stored across disks 0 through disk 4. Disk 5 stores parity for each Stripe 0 through Stripe 11. There are twelve stripes in the array.

According to the partial parity method, a logical operation is performed on two or more data blocks in a stripe, and a result of the logical operation is pre-written to a spare disk prior to a disk failure in the array. In one implementation, the logical operation is exclusive OR (XOR), although other logical operations that produce similar result or other usable result can be employed. In one embodiment, scrub module 338 alternates writing, to a spare disk, a result of an application of a logical operation on the first part of the disks in the array for a particular stripe and a result of a logical operation on the second part of the disks in the array. If there is an even number of disks in the array, the first part of the array includes data blocks from the first half of the array and the second part includes data blocks from the second half of the array. If there is an odd number of the disks in the array, the first part can be bigger than the second part or vice versa. For example, for evenly-numbered stripes, XOR for the first part is pre-written to a spare disk. For odd-numbered stripes, XOR for the second part is pre-written to a spare disk or vice versa. Although the maximum reduction in the number of I/O operations to reconstruct the failed drive is achieved when XOR for either the first or the second part of an array is pre-written to a spare disk prior to a disk failure in the array, a person of ordinary skill in the art would understand that according to the present invention, XOR for any data blocks in a stripe can be pre-written to a spare disk prior to a disk failure.

As shown in the illustrative embodiment in FIG. 8, scrub module 238 alternates pre-writing a result of XOR for the first half of the stripe and the second half of the stripe. For example, for Stripes 0, 2, 4, 6, 8, and 10, scrub module 338 pre-writes to the spare disk XOR for the first half of each stripe. For Stripes 1, 3, 5, 7, 9, and 11, scrub module 338 pre-writes to the spare disk XOR for the second half of each stripe.

It should be noted that as external client access requests are received by storage system 200, data stored Disk 0 through Disk 5 may be updated. Thus, data pre-written to a spare disk prior to a disk failure may become obsolete. If the data is modified on the disks, data structure 238 is updated on each external write request after a last scrub operation to indicate that data pre-written to a spare disk is not valid.

Figure 9:
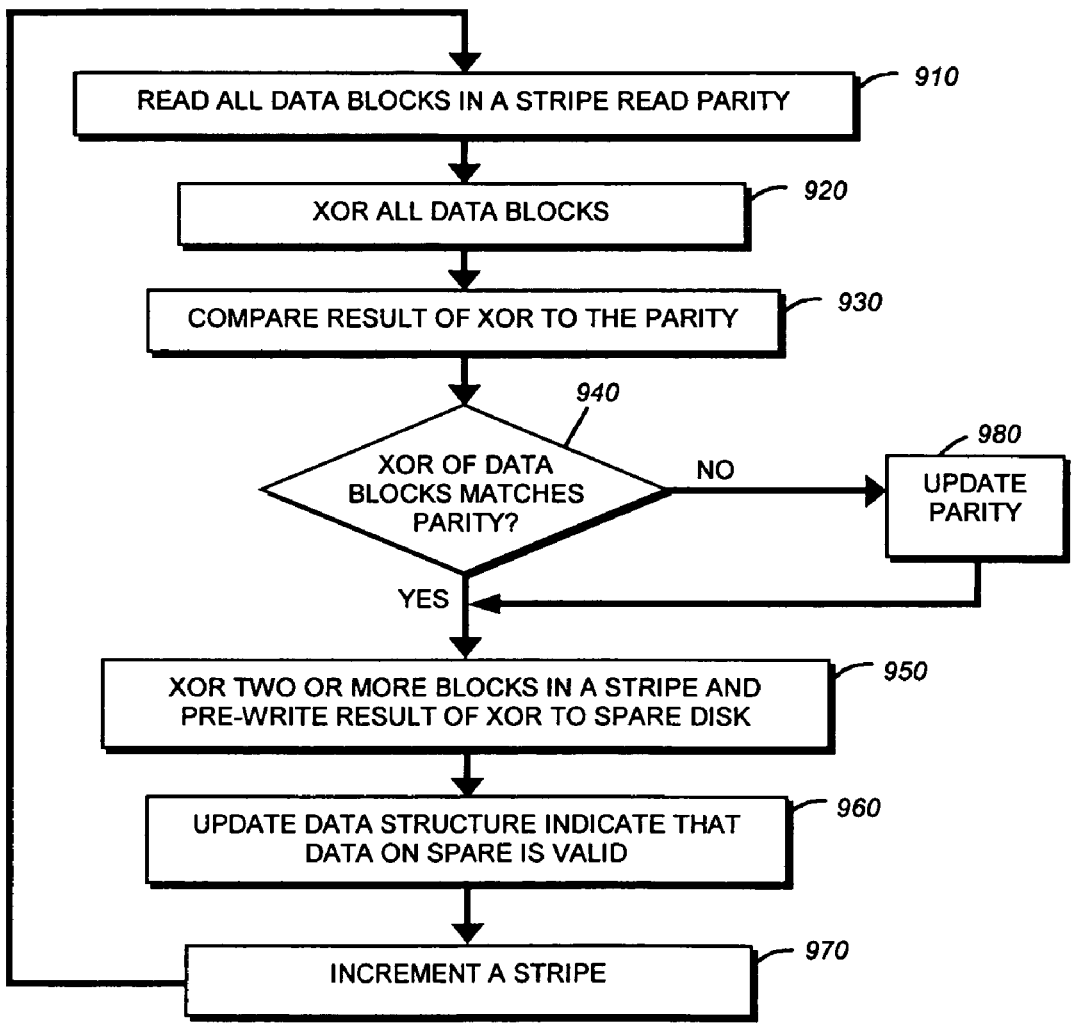
FIG. 9 is a flow diagram of the steps performed for pre-writing data to a spare disk prior to a disk failure according to the embodiment of FIG. 8.

FIG. 9 is a flow diagram of the steps performed by scrub module 338 to pre-write data from disks in a RAID group to a dedicated spare disk before a disk failure is detected in the RAID group.

Initially, at step 910, scrub module 338 starts with the first stripe, e.g., Stripe 0, and reads all data blocks in Stripe 0. Scrub module 338 also reads a parity block in Stripe 0. At step 920, scrub module 338 XOR's the data blocks. Scrub module 338 compares 930 the result of the XOR operation with the read parity block. If the two match at step 940, scrub module 338 XOR's data from selected disks in a stripe and writes a result of the XOR to a spare disk. At step 960, data structure 238 is updated to indicate that the data pre-written to a spare disk for a stripe are valid. Scrub module 338 increments the stripe number at step 970 and continues with the steps 910-970 until it reaches the last stripe.

If in step 940 the result of the XOR operation on the data blocks does not match the parity for the stripe, scrub module 980 updates the parity and loops to step 950.

(2) Reconstruct Operation

When the failed disk is detected, the RAID controller module 336 logically replaces a failed disk with a spare disk attached to storage system 200. This replacement permits the storage operating system to then reconstruct the data onto the spare disk. The reconstruct process is invoked upon detection of a disk failure.

As was previously described, conventionally, reconstruction of data on a failed disk in a six-drive array requires performing five read operations and one write operation for each stripe. For example, assume Disk 0 failed in array 800, reconstruct module 342 would have to perform the following operations to reconstruct data in Stripe 0. It should be noted that a spare disk becomes a reconstructing disk once it replaces a failed disk.

Read (D1, D2, D3, D4, and P)

XOR (D1, D2, D3, D4, and P)

Write result of the XOR to a reconstructing disk in Stripe 0.

According to an embodiment of the present invention, if data from the failed disk is included in XOR that was pre-written to the spare disk prior to a disk failure, reconstruct module 342 does not need to read those data blocks in a stripe which are not included in the XOR of data that was pre-written to the spare disk. Instead, reconstruct module 342 would only need to read the XOR from the reconstructing disk (the disk that was the spare) as well as data from the disk(s) for which XOR was pre-written (other than the data from the failed disk). The following example illustrates this concept: if Disk 0 fails, reconstruct module 342 will perform the following steps:

Read data from a reconstructing disk (e.g., XOR of D0, D1, and D2);

Read data from the disks for which XOR was pre-written to a spare disk (e.g., D1 and D2) other than the data from the failed disk;

XOR (D1, D2, XOR (D0,D1,D2))

Write result of the XOR to a reconstructing disk in Stripe 0.

Thus, since the result of XOR of D0, D1, and D2 was pre-written to a spare disk prior to a disk failure, reconstruct module 342 would have to perform only three read operations (reading data on reconstructing disk, reading D1, and reading D2) and one write operation. Thus, this embodiment eliminates the need to read data from all disks in the reconstructing stripe.

According to an embodiment of the present invention, if data from the failed disk (e.g., D5) are not included in the XOR of data that was pre-written to the spare disk during a scrub operation, reconstruct module 342 does not need to read those data blocks in a stripe which are included in the XOR of data that was pre-written to the spare (D8, D9, D10). Instead, reconstruct module 342 would only need to read XOR from the reconstructing disk (the disk that was the spare disk and that contains the XOR of D8, D9, and D10). Reconstruct module 342 would also need to read data from the disks that were not included in the XOR other than the data from the failed disk (e.g., D6 and D7). Thus, in the illustrated example, if Disk 0 fails, reconstruct module 342 will perform the following steps to reconstruct D5 in Stripe 1:

Read reconstructing disk (e.g., XOR of D8, D9, and P)

Read D6, D7

XOR (D6, D7, XOR (D8, D9, P)

Write result of the XOR to a reconstructing disk in Stripe 1.

As a result, only three read operations (reading data from reconstructing disk, read D6, and read D7) and one write operation need to be performed instead of the previously required five read operations and one write operation.

Figure 10:
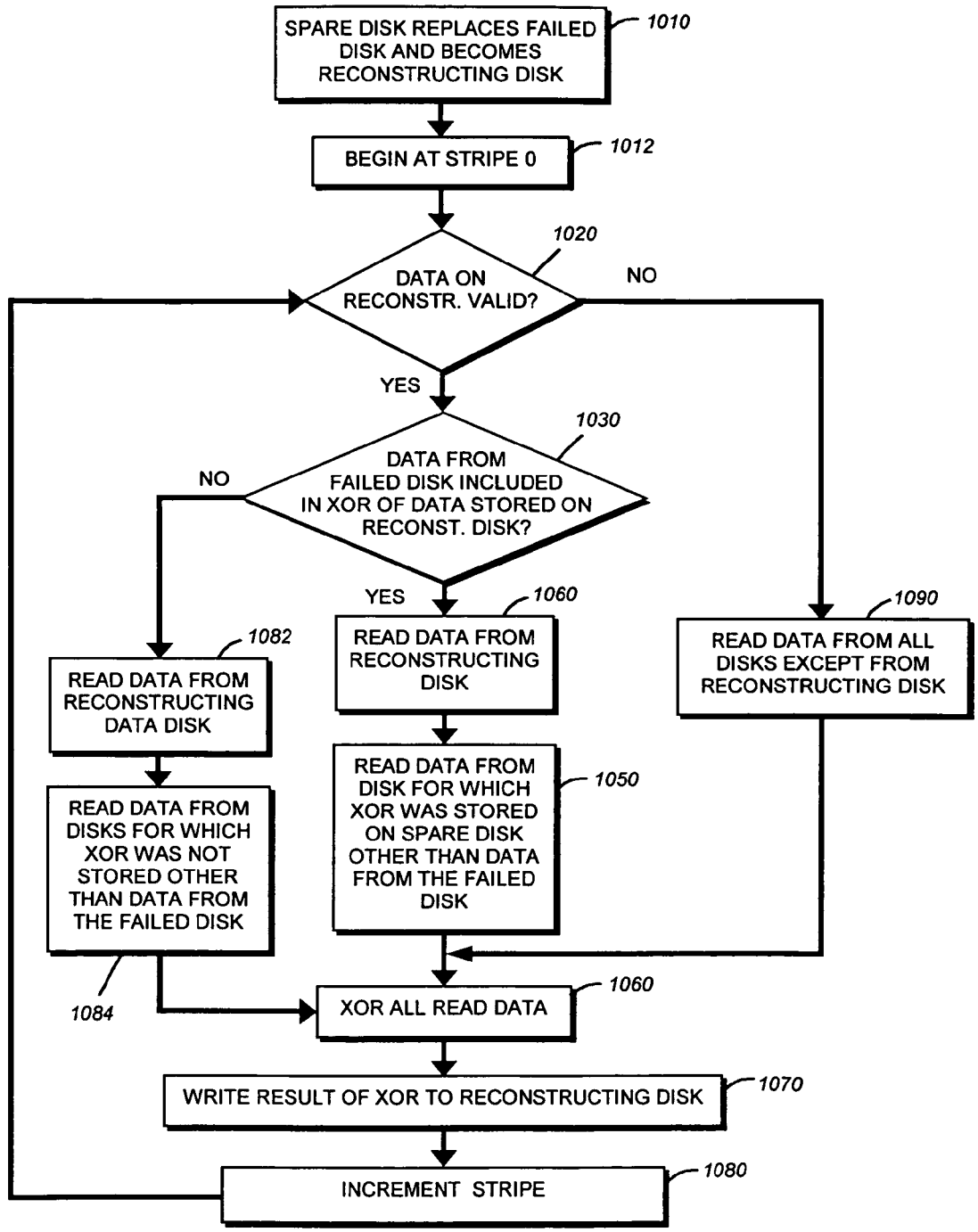
FIG. 10 is a flow diagram of the steps performed during a reconstruct process according to the partial parity method shown in FIG. 8.

Referring now to FIG. 10, it illustrates steps performed by reconstruct module 342 to reconstruct data according to partial parity method. Initially, a disk failure is detected. At step 1010, the failed disk is replaced with the spare disk to which data was pre-written, which becomes a reconstructing disk. Then a reconstruct process begins 1012 starting from the first stripe, e.g., Stripe 0. At step 1020, module 342 uses data structure 238 to determine whether a result of XOR operation pre-written the reconstructing disk for the reconstructing stripe is valid. If the data are valid, reconstruct module 342 uses the same algorithm as scrub module 338 to determine whether data from the failed disk included in the XOR of data pre-written to the reconstructing disk (step 1030). If so, reconstruct module 342 reads data from the reconstructing disk, at step 1040. At step 1050, reconstructing module 342 reads data from the disk(s) which were included in the XOR stored on the spare disk (other than the data from the failed disk). At step 1060, reconstruct module 342 XOR's data read in steps 1040 and 1050. Reconstruct module 342 writes the result of the XOR operation to the reconstructing disk. Reconstruct module 342 increments the stripe at step 1065 and loops back to step 1020.

If at step 1020, data pre-written to the reconstructing disk is not valid, reconstruct module 342 then reconstructs data from the failed disk using conventional technique. Specifically, reconstruct module 342 reads data from all the disks in the stripe other than the reconstructing disk at step 1090, XOR's the data at step 1060, and writes the result of the XOR operation to the reconstructing disk at step 1070.

If at step 1030, data from the failed disk is not included in the XOR of data stored on the reconstructing disk, at step 1082 reconstruct module 342 reads data from the reconstructing disk. At step 1084, it reads data from the disk(s) which were not included in the XOR stored on the spare disk (other than the data from the failed disk). The process then loops to step 1060.

Figure 14:
FIG. 14 is a table illustrating improvements in reducing the number of I/O operations performed during a reconstruct process according to the partial parity method.

Thus, according to this embodiment, pre-writing a result of a logical operation to a spare disk prior to a disk failure in an array eliminates the need for reading data from all disks in the array. This, in turn, reduces the number of I/O operations performed by reconstruct module 342 to reconstruct data on a failed disk. Although there is some rotation latency associated with the reconstruct process according to this embodiment due to reading and writing data in each stripe during a scrub operation, these read and write operations are performed during idle time and add no additional overhead to normal I/O operations. This embodiment advantageously speeds up the reconstruct time. This, in turn, adds data resiliency, eliminates some rotation latency, and increases overall performance of the storage system. For example, as shown in FIG. 14, in a six-drive array, there is a 33% reduction in the number of I/Os needed to perform when using partial parity method.

This embodiment also provides for recovery of data in RAID-4 when one disk is failed and another disk has a media error, provided that the spare disk does not store a result of an application of a logical operation on data stored both on the failed disk and on the disk that has a media error. This can be illustrated by the following example. Referring again to FIG. 8, assume that Disk 0 has a disk failure and Disk 3 has a media error in Stripe 0. If a result of XOR of (D0, D1, and D2) is pre-written to a spare disk prior to a disk failure in the array, the present invention provides for recovery of D3, if D3 cannot be read. To recover D3, reconstruct module 342 performs the following steps:

Read XOR (D0, D1, D2)

XOR (D4, D5, XOR(D0, D1, D2)

Result of XOR is data stored on Disk 3 in stripe D3.

Assume, however, that Disk 0 has a disk failure and Disk 1 has a media error in Stripe 0. Since the spare disk stores XOR of D0, D1, and D2, and neither D0 nor D1 can be read due to a failure or an error, the present invention cannot recover both D0 and D1.

C. Partial Parity Method Using XPWrite Command

Figure 11:
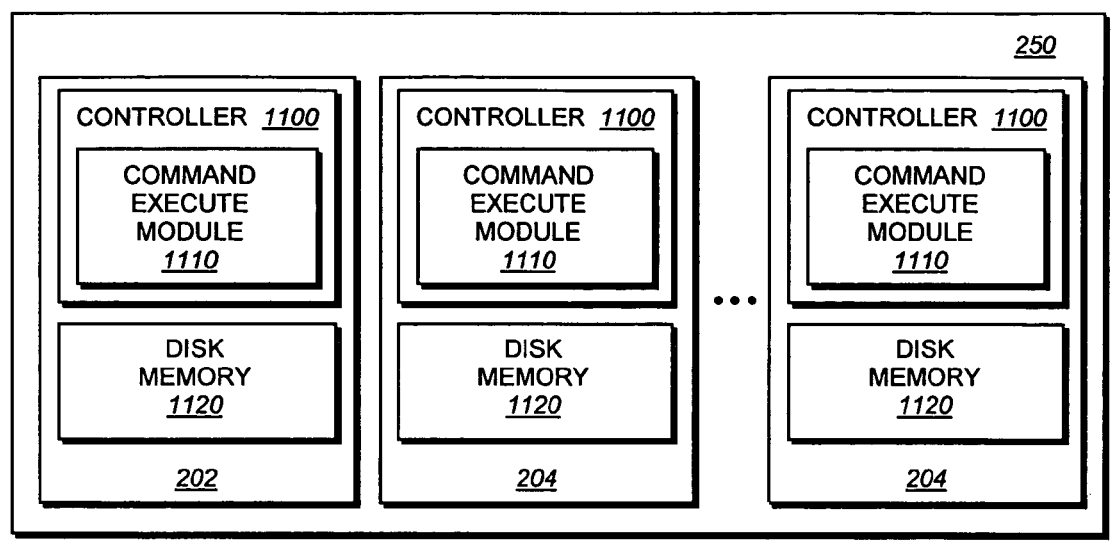
FIG. 11 is a block diagram of components of a RAID group shown in FIG. 2 to perform a partial parity method using XPWrite command.

Referring now to FIG. 11, it illustrates components residing on each disk 202 or 204 to execute XPWrite command issued by RAID optimization module 340. Each disk, whether it is a spare disk or any other disk that is part of a RAID group, includes a controller 1100, which implements a command executing module 1130. Command executing module 1130 is configured to compute data from the failed disk using data pre-written to a spare disk and data received, via the storage system 200 from other disks in the array. As a result, the need for reading, by the storage system 200, data pre-written to the spare disk is eliminated. Steps performed by module 1130 will be described in more detail in reference to FIG. 13. In a preferred embodiment, command executing module 1130 is implemented as firmware embedded into a hardware device, such as controller 1100. In another embodiment, command executing module 1130 can be implemented as software stored in the disk memory 1120.

According to the partial parity method using XPWrite command, during a scrub operation, data is pre-written to a spare disk using a partial parity method. Steps performed by scrub module 338 to write the data to a spare disk using partial parity method were described in reference to FIG. 6.

Referring now to the array shown in FIG. 8. As noted earlier, conventionally, reconstruction of data in a six-drive array requires five read operations and one write operation for each stripe. For example, assume Disk 0 failed, reconstruct module 342 would have to perform the following operations to reconstruct data in Stripe 0:

Read D1, D2, D3, D4, and P

XOR (D1, D2, D3, D4, and P)

Write result of the XOR to the reconstructing disk in stripe 0.

According to this embodiment of the present invention, if data from the failed disk (for example, D0) is included in the XOR of data that was pre-written to the spare disk prior to a disk failure, reconstruct module 342 does not need to read those data blocks in a stripe which are not included in the XOR of data that was pre-written to the spare. Instead, reconstruct module 342 would only need to read data from the disk(s) which were included in the XOR stored on the spare disk (e.g., D0, D1 and D2) (other than the data from the failed disk, e.g., D0). Reconstruct module 342 XORs D1 and D2.

To eliminate reading data pre-written to the spare disk, RAID optimization module 340 issues XPWrite command to the reconstructing disk (which was a spare disk prior to a disk failure). Command executing module 1130 executes the command as follows:

Read XOR (D0, D1, D2) pre-written to a spare disk into a disk memory;

Receive XOR (D1, D2) from storage driver module 335;

XOR (XOR(D1, D2), XOR (D0,D1,D2))

Write result of XOR to the reconstructing disk in Stripe 0.

Figure 13:
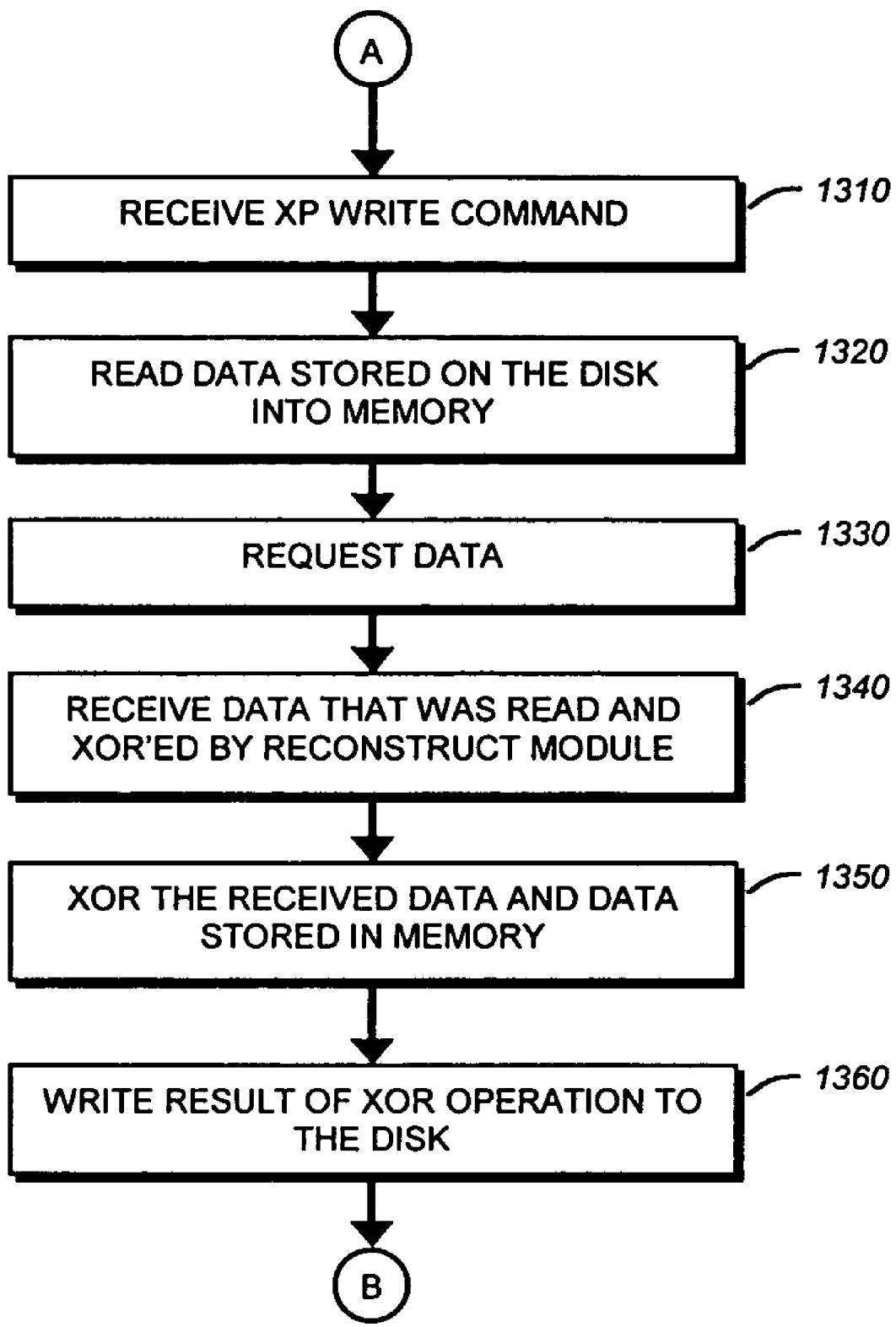
FIG. 13 is a flow diagram of the steps performed by a module executed at a reconstructing disk to execute XPWrite command.

Details on how command executing module 1130 receives data from storage system 200 are described in greater detail herein with reference to FIG. 13.

According to an embodiment of the present invention, if data from the failed disk (e.g., D5) is not included in the XOR of data that was pre-written to the spare disk during a scrub operation, reconstruct module 342 does not need to read those data blocks in a stripe which are included in the XOR that was pre-written to the spare disk (e.g., XOR (D8, D9, P)). Instead, reconstruct module 342 would only need to read data from the disks that were not included in the partial parity other than the data from the failed disk (e.g., D6 and D7). Reconstruct module 342 XORs D6 and D7. To eliminate reading partial parity from the reconstructing disk, RAID optimization module 340 issues XPWrite command to the spare disk. Command executing module 1130 executes the command as follows:

Read XOR (D8, D9, P) prewritten to a spare disk into disk memory;

Receive XOR (D6, D7) from storage driver module 335;

XOR (XOR(D6, D7), XOR(D8,D9,P))

Write result of XOR to the reconstructing disk in Stripe 1.

Thus, command executing module 1130 at the spare disk computes data from the failed disk using data pre-written to a spare disk prior to a disk failure in the array and data received, via the storage system 200 from other disks in the array. As a result, the need for reading, by the storage system 200, data pre-written to the spare disk is eliminated.

Figure 15:
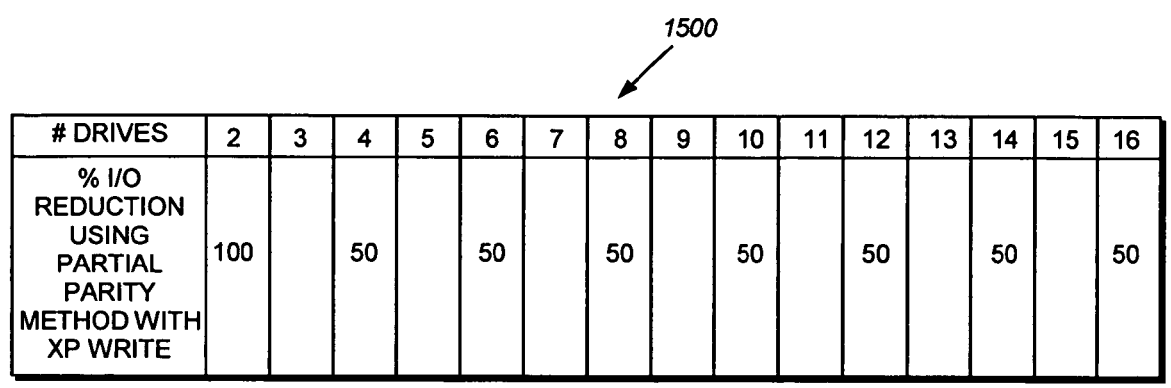
FIG. 15 is a table illustrating improvements in reducing the number of I/O operations performed during a reconstruct process according to the partial parity method using XPWrite command.

Referring now to FIG. 15, it illustrates a table 1500 that shows performance achieved by storage system 200 using partial parity method with XPWrite command to reconstruct data from a failed disk to a reconstructing disk. Each column represents a number of disks in an array. Each row represents a percentage of I/O reduction in reconstructing data using this embodiment. As shown in FIG. 15, with a six-drive array, which is a typical number of disks in a RAID group, 50% reduction in I/O operations is achieved.

Figure 12:
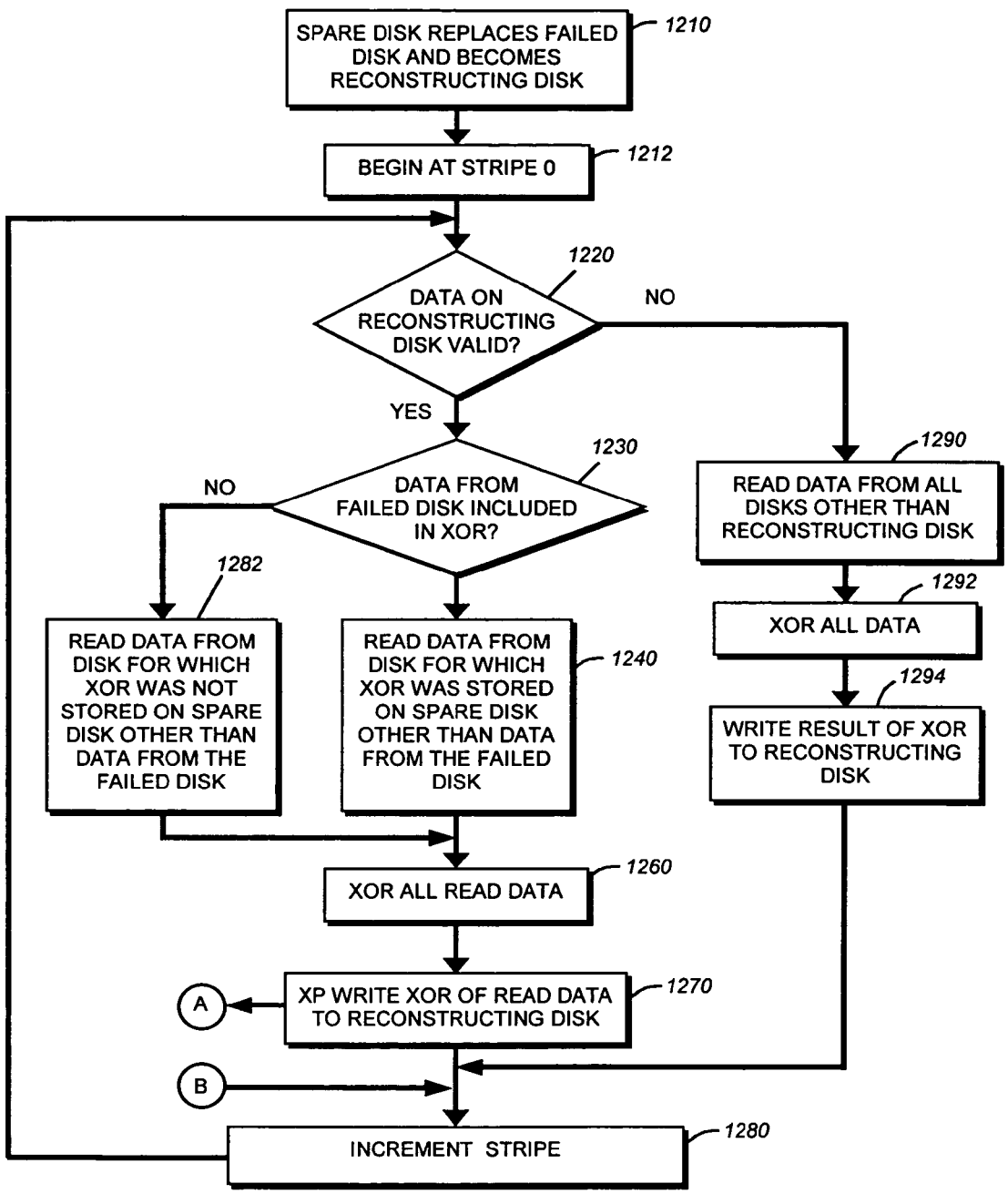
FIG. 12 is a flow diagram of the steps performed during a reconstruct process according to the partial parity method using XPWrite command.

Referring now to FIG. 12, it illustrates steps performed by reconstruct module 342 and RAID optimization module 340 according to partial parity method using XPWrite command. At step 1210, a spare disk replaces the failed disk. The spare disk becomes a reconstructing disk.

Reconstruct module 342 starts 1212 data reconstruction process from the first stripe, e.g., Stripe 0. At step 1220, module 342 uses data structure 238 to determine whether data stored on the reconstructing disk are valid. If the data stored on the reconstructing disk are valid, reconstruct module 342 determines at step 1230 if the reconstructing disk stores XOR for data from the failed disk using the same algorithm that scrub module 338 used. If so, at step 1240 reconstruct module reads data from the disks which were included in the XOR stored on the spare disk (other than the data from the failed disk). At step 1260, reconstruct module 342 XOR's the data read in step 1240 and invokes RAID optimization module 340. RAID optimization module 340 issues XPWrite command to the reconstructing disk, at step 1270.

Referring to FIG. 13, it illustrates the steps performed by command executing module 1130 at the reconstructing disk to execute XPWrite command. At step 1310, command executing module 1130 at the reconstructing disk receives the command issued by RAID optimization module 340. The command includes a block number at which data will be written as well as the number of blocks that the data occupies. In addition, the command includes an Operation Code (op-code) indicating the type of the command. Command executing module 1130 reads (step 1320), into disk memory 1120, a data block(s) indicated in the command. Command executing module 1130 requests, at step 1330, data from storage driver module 335, to execute the command. In one implementation, storage driver module 335 sends, to command executing module 1130, XOR of data read from the disks for which XOR was stored on the spare disk during a scrub operation except for data from the failed disk. In another embodiment, storage driver module 335 sends XOR of data read from the disks for which XOR was not stored on the spare disk during a scrub operation except for data from the failed disk.

Command executing module 1130 receives the data at step 1340 from the storage driver 435. At step 1350, command executing module 1130 XOR's the received data with the data stored in disk memory 1120. At step 1360, command executing module 1130 writes the result of the XOR operation to the physical data block(s) indicated in the XPWrite command.

As a result of computing data from the failed disk by module 1130, the necessity for reading data from the reconstructing disk by RAID controller module 336 is eliminated.

Referring again to FIG. 12, after XPWrite command has been executed by module 1130, reconstruct module 342 continues with reconstructing data and increments the stripe at step 1280. The process loops back to 1220.

If at step 1230, the reconstructing disk does not store XOR for data from the failed disk, reconstructing module 342 reads, at step 1250, data blocks which were not included in the XOR stored on the reconstructing disk except for data from the failed disk and loops back to step 1260.

If at step 1220, data on the reconstructing disk are not valid, reconstruct module 342 uses conventional mechanism for reconstructing data. Specifically, reconstruct module 342 reads data from all the disks other than the reconstructing disk, at step 1290. At step 1292, reconstruct module 342 XOR's data read in step 1290. At step 1294, reconstruct module 342 writes the result of the XOR operation to the reconstructing disk.

Similarly to the partial parity method described herein, this embodiment also provides for recovery of data in RAID-4 when one disk is failed and another disk has a media error, provided that the spare disk does not store a result of an application of a logical operation on data stored both on the failed disk and on the disk that has a media error.

Thus, embodiments of the present invention provide various mechanisms for reducing the number of I/O operations performed by a storage system during a process of reconstructing data on a failed disk. This reduction in I/O operations is achieved by partially pre-writing data from the disks in the array to a spare disk before a disk failure is detected in a disk array and reconstructing the data stored on the failed disk using partially pre-written data. In one embodiment, the data is pre-written to a spare disk while the system is idle, e.g., when a relatively low number of write and read access requests are originated from clients to the storage system. Although the present invention increases some overhead to an existing scrub operation by writing data to a spare disk, this process adds no significant additional overhead to normal I/O operations since it takes place when the system is in idle state. As a result of partially pre-writing data to a spare disk before a disk failure is detected, data is reconstructed much faster. This, in turn, adds data resiliency to a RAID group, eliminates some rotation latency, and increases overall performance of the storage system. Additionally, the data pre-written to the spare can be used to recover data when one disk has a failure and another disk has a media error in RAID-4. Similarly, the embodiments of the present invention can be used to recover from a two-disk failure and a media error in RAID-DP.

Although the present invention for purpose of explanation has been described with reference to specific exemplary embodiments, it will be understood that the invention is not limited to the embodiments described. A person of ordinary skill in the art would understand that the present invention can be practiced with modifications and alternations to those embodiments or can be practiced in other embodiments within the spirit and scope of the appended claims.

Although the present invention was described in a context of RAID-4 level implementation, a person of ordinary skill in the art would understand that other types and levels of RAID implementations may be used in accordance with the inventive principles described herein. Moreover, although the present invention has been described in the context of pre-writing data to a spare disk during a scrub operation because there is no performance impact on normal I/O operations, a person of ordinary skill in the art would understand that data can be pre-written to a spare disk any time prior to a disk failure in the array.

To improve reliability and facilitate disaster recovery in the event of a failure of a storage system, it is well-known to synchronously write data to two disk arrays. As a result, a one-to-one relationship is created between a source disk array and a disk array that serves as a mirror. According to an embodiment of the present invention, by pre-writing data to a spare disk using the alternating method, a partial mirror of a RAID group is created. In this situation, the partial mirror is used to reconstruct data from the failed disk.

Furthermore, the use of the phrase "one embodiment" throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or system.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A method for reducing a number of I/O operations performed by a storage system during a process of reconstructing data from a failed device to a spare device, the method comprising:
   partially pre-writing data stored in an array of mass storage devices to a spare device prior to detecting a failed device in the array of mass storage devices; and
   reconstructing data from the failed device using the partially pre-written data without reading data from all the devices in the array.

2. The method of claim 1, further comprising:
   replacing the failed device with the spare device upon identifying the failed device;
   determining whether data from the failed device are pre-written to the spare device and the data are valid; and
   responsive to a positive determination, reconstructing the data without reading the data from any device in the array or writing data to the spare device.

3. The method for claim 1, wherein the spare device is dedicated to the array.

4. The method of claim 1, further comprising:
   identifying a device in the array from which data to be pre-written to a spare device for a stripe as the stripe number modulo total number of devices in the array.

5. The method of claim 1, wherein the data is partially pre-written to the spare device during an idle state.

6. The method of claim 1, wherein the data is partially pre-written to the spare device during I/O operations initiated by a client system requesting services of the storage system.

7. The method of claim 1, wherein pre-writing data to a spare device during a scrub operation further comprises writing, to the spare device, a result of a logical operation performed on data stored on two or more devices in the array of mass storage devices.

8. The method of claim 7, wherein the logical operation is an exclusive-OR (XOR) operation.

9. The method of claim 7, wherein reconstructing data on the failed device further comprises:
   computing data from the failed device using data partially pre-written to the spare device and data received from other devices in the array.

10. The method of claim 9, further comprising:
    responsive to data from the failed device being included in a result of the logical operation pre-written to the spare disk, reading into a memory, by the command executing module, data stored on the spare device;
    receiving, by the command executing module, from the storage system, the XOR of data from the devices that were included in the result of logical operation pre-written to the spare device, other than data from the failed device;
    XOR'ing the data being read; and
    writing a result of the XOR operation to the spare device.

11. The method of claim 9, further comprising:
    responsive to data from the failed device not being included in a result of the logical operation pre-written to the spare disk, reading into a memory, by the command executing module, data stored on the spare device;
    receiving, by the command executing module, from the storage system the XOR of data from the devices that were not included in the result of logical operation pre-written to the spare device, other than data from the failed device;
    XOR'ing the data being read; and
    writing a result of the XOR operation to the spare device.

12. The method of claim 1, further comprising alternating writing, to the spare device, a result of logical operation performed on data stored in a first part of the array in a stripe and a result of a logical operation on data stored in a second part of the array in the stripe.

13. The method of claim 12, wherein the first part of the array is a first half of the array and the second part of the array is the second half of the array.

14. The method of claim 12, wherein reconstructing data on the failed device further comprises:
    determining whether data from the failed device is included in the result of the logical operation pre-written to the spare device;
    responsive to a positive determination, reconstructing data from the failed device by:
    reading data from the spare device;
    reading data from the devices that were included in the result of the logical operation pre-written to the spare disk other than data from the failed device, without reading data from those device that were not included in the result of the logical operation;
    performing a logical operation on the data being read; and
    writing a result of the logical operation to the spare device.

15. The method of claim 14, wherein the logical operation is an exclusive-OR (XOR) operation.

16. The method of claim 15, further comprising:
responsive to a negative determination, reconstructing data on the failed device by reading data from the spare device,
reading data from the devices that were not included in the result of the logical operation pre-written to the spare device, other than data from the failed device, without reading data from those device that were included in the result of the logical operation pre-written to the spare device,
performing a logical operation on the data being read, and writing a result of the logical operation to the spare device.

17. The method of claim 16, wherein the logical operation is an exclusive-OR (XOR) operation.

18. A storage system for reducing the number of I/O operations performed during a process of reconstructing data from a failed device to a spare device, the system comprising:
a scrub module executed by a processor, the scrub module configured to partially pre-write data stored in an array of mass storage devices to a spare device prior to detecting a failed device in the array of mass storage devices; and
a reconstruct module executed by the processor, the reconstruct module configured to reconstruct data from the failed device using the partially pre-written data without reading data from all the devices in the array.

19. The storage system of claim 18, further comprising:
a RAID controller module configured to identify a failed device in the array and to replace the failed device with a spare device.

20. The system of claim 18, wherein the reconstruct module is further configured to:
reconstruct the data without reading the data from all devices in the array, responsive to the data from the failed device being pre-written to the spare device and the data being valid.

21. The system of claim 18, wherein the scrub module is further configured to:
identify a device in the array from which data to be pre-written to a spare device for a stripe as the stripe number modulo total number of devices in the array.

22. The system of claim 18, wherein the scrub module is further configured to pre-write, to the spare device, a result of a logical operation performed on data stored in two or more devices in a stripe in the array.

23. The system of claim 18, further comprising:
a command executing module implemented at the spare device, configured to reconstruct data from the failed device using data partially pre-written to the spare device and data received, from the storage system, from other devices in the array.

24. The system of claim 23, wherein the command executing module comprises program code executed on one or more controllers at the spare device.

25. The system of claim 18, further comprising a data structure for indicating whether data stored on the spare device are valid.

26. The system of claim 19, wherein the RAID controller module, the scrub module, and the reconstruct module each comprising program code executed on one or more processors of the storage system.

27. The system of claim 18, wherein the scrub module is further configured to pre-write data to the spare device during an idle state.

28. The system of claim 18, wherein the scrub module is further configured to pre-write data to the spare device during I/O operations initiated by a client system requesting services of the storage system.

29. A method for recovering data from a device that has a media error in an array of mass storage devices having a failed device, wherein the data from the failed device is pre-written to a spare device prior to a device failure in the array, the method comprising:
reading data pre-written to the spare device;
reading data from other devices in the array other than the failed device and other than the device with the media error; and
recovering the data stored on the device that has a media error by performing a logical operation on the read data.

30. A method for recovering data from a device that has a media error in an array of mass storage devices having a failed device and a spare device storing a result of an application of a logical operation on data stored in the array, the method comprising:
determining whether the result of the application of the logical operation includes both data stored on a failed device and data stored on a device that has a media error;
responsive to a negative determination, determining whether the result of the application of the logical operation includes data stored on a device that has a media error; responsive to a positive determination, reading data from those devices in the array that are included in the result of the logical operation pre-written to the spare device in the stripe except for the device with the media error;
reading the result of the logical operation from the spare device; and
recovering the data stored on the device that has a media error by performing a logical operation on the data being read and responsive to a negative determination
reading data from those devices in the array that are not included in the result of the logical operation pre-written to the spare device in the stripe except for the device with a media error;
reading the result of the logical operation from the spare device; and
recovering the data stored on the device that has a media error by performing a logical operation on the data being read.

31. A computer-program product comprising:
a computer-readable medium having computer program code embodied thereon for reducing a number of I/O operations performed by a storage system during a process of reconstructing data from a failed device to a spare device, the computer program code adapted to:
partially pre-write data stored in an array of mass storage devices to a spare device prior to detecting a failed device in the array of mass storage devices; and
reconstruct data from the failed device using the partially pre-written data without reading data from all the devices in the array.

32. The computer program code of claim 31, further adapted to:
replace the failed device with the spare device upon identifying the failed device;
determine whether data from the failed device are pre-written to the spare device and the data are valid; and
reconstruct the data without reading the data from any device in the array or writing data to the spare device responsive to a positive determination.

* * * * *

UNITED STATES PATENT AND TRADEMARK OFFICE
CERTIFICATE OF CORRECTION

PATENT NO. : 7,647,526 B1
APPLICATION NO. : 11/634497
DATED : January 12, 2010
INVENTOR(S) : James A. Taylor It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 462 days.

Signed and Sealed this

Sixteenth Day of November, 2010

David J. Kappos
*Director of the United States Patent and Trademark Office*